US008688435B2

(12) United States Patent
Nasri et al.

(10) Patent No.: US 8,688,435 B2
(45) Date of Patent: Apr. 1, 2014

(54) SYSTEMS AND METHODS FOR NORMALIZING INPUT MEDIA

(75) Inventors: Babak Nasri, Toronto (CA); Selva Thayaparam, Scarborough (CA)

(73) Assignee: Voice on the Go Inc., Markham (CA)

( * ) Notice: Subject to any disclaimer, the term of this patent is extended or adjusted under 35 U.S.C. 154(b) by 774 days.

(21) Appl. No.: 12/887,697

(22) Filed: Sep. 22, 2010

(65) Prior Publication Data
US 2012/0072204 A1 Mar. 22, 2012

(51) Int. Cl.
*G06F 17/27* (2006.01)
(52) U.S. Cl.
USPC ............ 704/9; 704/277; 704/275; 704/260; 704/254; 707/661; 707/769; 714/57; 715/255; 715/717; 717/143; 719/328; 726/7
(58) Field of Classification Search
USPC ....... 726/7; 719/328; 717/146; 715/717, 255; 714/57; 707/769, 661; 704/9, 277, 275, 704/260, 254
See application file for complete search history.

(56) References Cited

U.S. PATENT DOCUMENTS

| | | | |
|---|---|---|---|
| 5,040,218 A | 8/1991 | Vitale et al. | |
| 5,111,398 A | 5/1992 | Nunberg et al. | |
| 5,555,343 A | 9/1996 | Luther | |
| 5,634,084 A | 5/1997 | Malsheen et al. | |
| 5,682,501 A | 10/1997 | Sharman | |
| 5,751,906 A | 5/1998 | Silverman | |
| 5,761,640 A | 6/1998 | Kalyanswamy et al. | |
| 6,115,686 A | 9/2000 | Chung et al. | |
| 6,163,769 A | 12/2000 | Acero et al. | |
| 6,523,172 B1 * | 2/2003 | Martinez-Guerra et al. | . 717/143 |
| 6,675,159 B1 * | 1/2004 | Lin et al. ............................... | 1/1 |
| 6,801,893 B1 | 10/2004 | Backfried et al. | |
| 6,847,931 B2 | 1/2005 | Addison et al. | |

(Continued)

FOREIGN PATENT DOCUMENTS

WO 2008113717 A1 9/2008

OTHER PUBLICATIONS

International Search Report and Written Opinion dated Nov. 30, 2011, International Patent Application No. PCT/CA2011/001047.

(Continued)

*Primary Examiner* — Michael Colucci
(74) *Attorney, Agent, or Firm* — Bereskin & Parr LLP/S.E.N.C.R.L., s.r.l.

(57) ABSTRACT

A method and system for processing input media for provision to a text to speech engine comprising: a rules engine configured to maintain and update rules for processing the input media; a pre-parsing filter module configured to determine one or more metadata attributes using pre-parsing rules; a parsing filter module configured to identify content component from the input media using the parsing rules; a context and language detector configured to determine a default context and a default language; a learning agent configured to divide the content component into units of interest; a tagging module configured to iteratively assign tags to the units of interest using the tagging rules, wherein each tag is associated with a post-parsing rule; a post-parsing filter module configured to modify the content component by executing the post-parsing rules identified by the tags assigned to the phrases and strings. The context and language detector, tagging module, learning agent and post-parsing filter module are configured to iteratively process the content component and modifications thereto until there are no further modifications or a threshold number of iterations are performed.

29 Claims, 3 Drawing Sheets

(56) References Cited

U.S. PATENT DOCUMENTS

| | | | |
|---|---|---|---|
| 7,027,975 B1* | 4/2006 | Pazandak et al. | 704/9 |
| 7,039,951 B1* | 5/2006 | Chaudhari et al. | 726/7 |
| 7,069,216 B2 | 6/2006 | DeMoortel et al. | |
| 7,082,397 B2 | 7/2006 | Cohen et al. | |
| 7,127,396 B2 | 10/2006 | Chu et al. | |
| 7,137,126 B1* | 11/2006 | Coffman et al. | 719/328 |
| 7,219,060 B2 | 5/2007 | Coorman et al. | |
| 7,343,290 B2 | 3/2008 | Breuer | |
| 7,496,498 B2 | 2/2009 | Chu et al. | |
| 7,536,296 B2 | 5/2009 | Badino | |
| 7,558,732 B2 | 7/2009 | Kustner et al. | |
| 7,590,540 B2 | 9/2009 | Zhang et al. | |
| 7,917,815 B2* | 3/2011 | Rapp et al. | 714/57 |
| 8,024,196 B1* | 9/2011 | Wodtke et al. | 704/277 |
| 2001/0049602 A1* | 12/2001 | Walker et al. | 704/260 |
| 2002/0178005 A1* | 11/2002 | Dusan et al. | 704/254 |
| 2004/0054535 A1 | 3/2004 | Mackie et al. | |
| 2004/0205473 A1* | 10/2004 | Fisher et al. | 715/500 |
| 2005/0043940 A1* | 2/2005 | Elder | 704/9 |
| 2006/0106618 A1 | 5/2006 | Racovolis et al. | |
| 2006/0136220 A1* | 6/2006 | Gurram et al. | 704/275 |
| 2007/0038610 A1* | 2/2007 | Omoigui | 707/3 |
| 2007/0130337 A1 | 6/2007 | Arnison | |
| 2007/0213986 A1 | 9/2007 | Bodin et al. | |
| 2008/0235585 A1* | 9/2008 | Hart et al. | 715/717 |
| 2009/0055186 A1* | 2/2009 | Lance et al. | 704/260 |
| 2010/0082348 A1 | 4/2010 | Silverman et al. | |
| 2010/0145984 A1* | 6/2010 | Palaniappan | 707/769 |
| 2010/0228549 A1 | 9/2010 | Herman et al. | |
| 2010/0250497 A1* | 9/2010 | Redlich et al. | 707/661 |

OTHER PUBLICATIONS

SRILM—The SRI Language Modeling Toolkit—http://www.speech.sri.com/projects/srilm/, 1999.

The CMU-Cambridge Statistical Language Modeling Toolkit v2—http://svr-www.eng.cam.ac.uk~prc14/toolkit_documentation.html <http://svr-www.eng.cam.ac.uk/%7Eprc14/toolkit_documentation.html>, 1999.

Edinburgh Speech Tools Library System Documentation Edition 1.2, for 1.2.3. Jan. 24, 2003, Centre for Speech Technology, University of Edinburgh, http://www.cstr.ed.ac.uk/projects/speech_tools/manual-1.2.0/.

European Language Resources Association—Distribution of your Language Resources—2008, http://www.elra.info/Distribution-of-your-LRs.html.

Grefenstette, Greg, Comparing Two Language Identification Schemes, Xerox Research Centre Europe, The proceedings of 3rd International Conference on Statistical Analysis of Textual Data (JADT 95), Rome, Italy, Dec. 1995, http://www.xrce.xerox.com/Research-Development/Publications/1995-012.

European Parliament Proceedings Parallel Corpus 1996-2009, http://www.statmt.org/europarl/, 1996.

Speech Synthesis Markup Language (SSML) Version 1.0 W3C Recommendation Sep. 7, 2004, http://www.w3.org/TR/speech-synthesis/.

\* cited by examiner

SYSTEMS AND METHODS FOR NORMALIZING INPUT MEDIA

FIELD

The described embodiments relate to systems and methods for normalizing input media and in particular to systems and methods for normalizing input media for provision to a text-to-speech engine.

BACKGROUND

A text-to-speech engine converts text into synthesized audio output. The original source of the text may be in a variety of types such as plain text, e-mail, HTML, XML, rich text format, portable document format, PS, GPS coordinates, RSS, SMS, MMS, video, and a multi-media link, for example. Digital media may contain text data along with other data relating to context, formatting, visual presentation, and layout, for example. Text may contain punctuation, acronyms, abbreviations, ambiguities, short forms, informalities, different languages, symbols, grammatical errors, formatting errors. These factors introduce challenges and complications for text-to-speech engines.

SUMMARY

In a first aspect, some embodiments of the invention provide a system for processing input media for provision to a text to speech engine, the system comprising: a rules engine configured to maintain and update rules for processing the input media, wherein the rules comprise pre-parsing rules, parsing rules, tagging rules, and post-parsing rules; a pre-parsing filter module configured to determine one or more metadata attributes using pre-parsing rules, wherein one metadata attribute is an application type; a parsing filter module configured to query the rules engine for parsing rules associated with the one or more metadata attributes and to identify a content component from the input media using the parsing rules; a context and language detector configured to determine a default context from a plurality of contexts and a default language from a plurality of languages for the content component; a learning agent configured to divide the content component into units of interest; a tagging module configured to query the rules engine for tagging rules associated with the default context and the default language and to iteratively assign tags to the units of interest using the tagging rules, wherein each tag is associated with a post-parsing rule; a post-parsing filter module configured to modify the content component by executing the post-parsing rules identified by the tags assigned to the units of interest; wherein the context and language detector, tagging module, learning agent and post-parsing filter module are configured to iteratively process the content component and modifications thereto until there are no further modifications or a threshold number of iterations are performed; and an output module configured to transmit the modified content component.

In another aspect, some embodiments of the invention provide the system a text to speech dictionary module configured to process common literals in the content component; a formatting module configured to convert the content component to speech synthesis markup language text with embedded speech directives; and a text to speech engine configured to convert the speech synthesis markup language text to speech signals and transmit the speech signals.

In another aspect, some embodiments of the invention provide the system wherein the context and language detector is operable to detect a local language for one or more units of interest of the content component, wherein the local language is different from the default language; and wherein the tagging module is configured to query the rules engine for tagging rules associated with the local language.

In another aspect, some embodiments of the invention provide the system wherein a metadata attribute is the default context, and wherein the pre-parsing module is configured to determine the default context based on the application type.

In another aspect, some embodiments of the invention provide the system wherein a metadata attribute is the default language, and wherein the pre-parsing module is configured to determine the default language based on the language identifying meta-data or the application type.

In another aspect, some embodiments of the invention provide the system wherein each rule comprises an ambiguous case resolution mechanism; wherein, in response to detecting an ambiguity in the content component, the ambiguous case resolution mechanism uses the metadata attributes and statistical data to statistically resolve the a ambiguity.

In another aspect, some embodiments of the invention provide the system further comprising a quality assurance agent that is prompted to resolve an ambiguity in the event the ambiguity cannot be resolved statistically with a pre-configured minimum level of confidence.

In another aspect, some embodiments of the invention provide the system where in the pre-parsing module is configured to determine the one or more metadata attributes by applying different test rules to the input media; computing a value for each test rule applied; determining which test rule computed the highest score; and using the test rule with the highest score to determine the one or more metadata attributes.

In another aspect, some embodiments of the invention provide the system where in the pre-parsing module is configured to determine metadata attributes by comparing strings in the input media to a set of dictionaries.

In another aspect, some embodiments of the invention provide the system wherein upon determining that two or more test rules have the same highest score, the pre-parsing module is further configured to apply a default priority list to determine which of the two or more test rules to use to determine the metadata attributes.

In another aspect, some embodiments of the invention provide the system wherein each tag is associated with a confidence score and wherein when two or more tags conflict the post-parsing filter module is configured to execute the post-parsing rule associated with the tag with the highest confidence score.

In another aspect, some embodiments of the invention provide the system wherein the tagging module is configured to iteratively assign the tags until no more tagging rules apply.

In another aspect, some embodiments of the invention provide the system wherein the tagging module is configured to iteratively assign the tags until a maximum limit of tags per word is reached.

In another aspect, some embodiments of the invention provide the system wherein the context and language detector determines the default context by computing, for each context, an aggregate score for the content component using a context model, wherein the context model defines, for each context, a list of strings and associated scores, wherein the default context is the context with the highest aggregate score for the content component.

In further aspect, some embodiments of the invention provide a method for processing input media for provision to a text to speech engine, the method comprising: maintaining and updating rules for processing the input media, wherein the rules comprise pre-parsing rules, parsing rules, tagging rules, and post-parsing rules; determining one or more metadata attributes using pre-parsing rules, wherein one metadata attribute is an application type; identifying a content component from the input media using parsing rules associated with the one or more metadata attributes; determining, for the content component, a default context from a plurality of contexts and a default language from a plurality of languages; dividing the content component into units of interest; iteratively assigning tags to the units of interest using the tagging rules associated with the default context and the default language, wherein each tag is associated with a post-parsing rule; modifying the content component by executing the post-parsing rules identified by the tags assigned to the phrases and strings; iteratively processing the content component and modifications thereto until there are no further modifications or a threshold number of iterations are performed; and outputting the modified content component.

In another aspect, some embodiments of the invention provide the method further comprising: processing common literals in the content component; converting the content component to speech synthesis markup language text with embedded speech directives; and converting the speech synthesis markup language text to speech signals and transmitting the speech signals.

In another aspect, some embodiments of the invention provide the method further comprising detecting a local language for one or more phrases and strings of the content component, wherein the local language is different from the default language; and querying the rules engine for tagging rules associated with the local language.

In another aspect, some embodiments of the invention provide the method wherein a metadata attribute is a default context, and the method further comprises determining the default context based on the application type.

In another aspect, some embodiments of the invention provide the method wherein a metadata attribute is the default language, and the method further comprises determining the default language based on the language identifying meta-data or the application type.

In another aspect, some embodiments of the invention provide the method wherein each rule comprises an ambiguous case resolution mechanism; wherein the method further comprises detecting an ambiguity in the content component and using the ambiguous case resolution mechanism to statistically resolve the a ambiguity based on the metadata attributes and statistical data.

In another aspect, some embodiments of the invention provide the method further comprising prompting a quality assurance agent to resolve an ambiguity in the event the ambiguity cannot be resolved statistically with a pre-configured minimum level of confidence.

In another aspect, some embodiments of the invention provide the method wherein determining the one or more metadata attributes comprises: applying different test rules to the input media; computing a value for each test rule applied; determining which test rule computed the highest score; and using the test rule with the highest score to determine the one or more metadata attributes.

In another aspect, some embodiments of the invention provide the method wherein determining metadata attributes comprises comparing strings in the input media to a set of dictionaries.

In another aspect, some embodiments of the invention provide the method wherein upon determining that two or more test rules have the same highest score, the method further comprises applying a default priority list to determine which of the two or more test rules to use to determine the metadata attributes.

In another aspect, some embodiments of the invention provide the method wherein each tag is associated with a confidence score and wherein when two or more tags conflict the method further comprises executing the post-parsing rule associated with the tag with the highest confidence score.

In another aspect, some embodiments of the invention provide the method further comprising iteratively assigning the tags until no more tagging rules apply. In another aspect, some embodiments of the invention provide the method further comprising iteratively assigning the tags until a maximum limit of tags per word is reached.

In another aspect, some embodiments of the invention provide the method further comprising determining the default context by computing, for each context, an aggregate score for the content component using a context model, wherein the context model defines, for each context, a list of strings and associated scores, wherein the default context is the context with the highest aggregate score for the content component.

In further aspect, some embodiments of the invention provide a non-transitory computer-readable medium upon which a plurality of instructions are stored, the instructions for performing the steps of: maintaining and updating rules for processing the input media, wherein the rules comprise pre-parsing rules, parsing rules, tagging rules, and post-parsing rules; determining one or more metadata attributes using pre-parsing rules, wherein one metadata attribute is an application type; identifying a content component from the input media using parsing rules associated with the one or more metadata attributes; determining, for the content component, a default context from a plurality of contexts and a default language from a plurality of languages; dividing the content component into units of interest; iteratively assigning tags to the units of interest using the tagging rules associated with the default context and the default language, wherein each tag is associated with a post-parsing rule; modifying the content component by executing the post-parsing rules identified by the tags assigned to the phrases and strings; iteratively processing the content component and modifications thereto until there are no further modifications or a threshold number of iterations are performed; and outputting the modified content component.

These and other aspects and features of various embodiments will be described in greater detail below.

BRIEF DESCRIPTION OF THE DRAWINGS

For a better understanding of the example embodiments described herein, and to show more clearly how they may be carried into effect, reference will now be made, by way of example, to the accompanying drawings in which.

Figure 1:
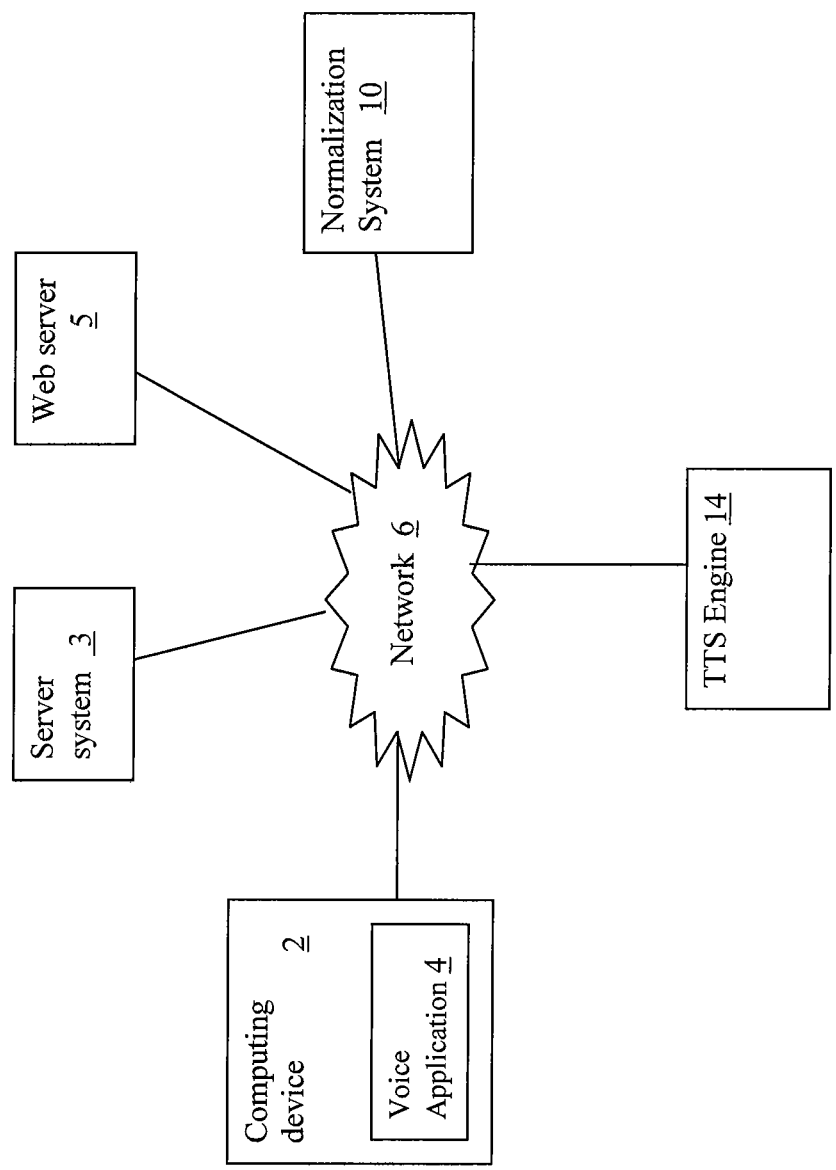
FIG. 1 is a block diagram of components interacting with a system for normalizing input media in accordance with an example embodiment.

The skilled person in the art will understand that the drawings, described below, are for illustration purposes only. The drawings are not intended to limit the scope of the applicants' teachings in any way. Also, it will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DESCRIPTION OF EXEMPLARY
EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to input data to perform the functions described herein and generate output information. The output information is applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case; the language may be a compiled or interpreted language. Each such computer program is preferably stored on a storage media or a device (e.g. ROM or magnetic diskette), readable by a general or special purpose programmable computer, for configuring and operating the computer when the storage media or device is read by the computer to perform the procedures described herein. The inventive system may also be considered to be implemented as a non-transitory computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a physical non-transitory computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Reference is first made to FIG. 1, which illustrates a block diagram of components interacting with a system 10 for normalizing input media 8 for provision to a text-to-speech ("TTS") engine 14 in accordance with an example embodiment. System 10 is configured to receive a wide variety of input media 8 from various types of components and is further configured to provide normalized input media 8 to TTS engine 14. Normalization is the process of converting input media 8 (including text data, video data, audio data, presentation data, layout data and formatting data) to normalized data that is prepared in a way that is optimized for a TTS engine 14 to generate a natural and understandable audio synthesis. Normalized input media 8 is a modified content component of the input media 8 where the modification assists a TTS engine 14 when generating audio synthesis.

System 10 is configured to receive input media 8 by connecting to computing device 2, server system 3, web server 5, or another component (not shown) via network 6. System is configured to connect to TTS engine 14 via network 6 to provide normalized input media 8 for conversion into synthesized audio. TTS engine 14 is configured to transmit the speech signals (synthesized audio) representing normalized input media 8 (a modified content component of the input media 8). Network 6 may be any network(s) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

A user may install a voice application 4 on a computing device 2 to provide input media 8 to system 10 or receive synthesized audio representing normalized input media 8 from TTS engine 14. For example, a user may use system 10 to listen to their email, news feeds, weather, traffic, sports, general interest articles, social media content, SMS, RSS feeds, text and other instant messages residing on or accessible by computing device 2, server system 3 or web server 5.

Computing device 2 may be any networked computing device including a processor and memory, such as a personal computer, workstation, server, portable computer, mobile phone, personal digital assistant, laptop, smart phone, WAP phone, or a combination of these. Computing device 2 typically includes one or more input devices, such as a keyboard, mouse, camera, touch screen and a microphone, and also includes one or more output devices such as a display screen and a speaker. Computing device 2 has a network interface for connecting to network 6 in order to communicate with other components.

Voice application 4 may be any software application, application plug-in (e.g. a widget), instant messaging application, mobile device application, e-mail application, online telephony application, java application, web page, or web object (e.g. a widget) residing or rendered on computing device 2. Alternatively, voice application 4 may reside on another device, server system 3, or web server 5.

For example, voice application 4 may be an application configured to provide remote access to a user's remote computer system, such as is described in U.S. patent application Ser. No. 11/560,161, the contents of which are incorporated by reference herein. Input media 8 resides on or is accessible by the remote computer system. User may use system 10 to readback an audio representation of a computer file residing on the user's remote computer system. System 10 is configured to receive the computer file (input media 8) via network 6 and provide normalized input media 8 to TTS engine for conversion into speech signals (synthesized audio). TTS engine 14 is configured to connect to computing device 2 to transmit the speech signals to user.

Input media 8 may contain content, information, text, video and audio content that is structured in a format to help the user understand the message through the use of visual presentation data, layout data, and formatting data. This visual presentation makes it easy for the user to understand and process the information. In a voice interface, the lack of visual presentation and formatting such medium, along with the complexity of the format makes text normalization a challenge when automated text-to-speech engines are "playing back" or "reading out" dynamic text.

System 10 may be configured to generate normalized input media 8 (i.e. a modified content component of the input media 8) formatted with directives for the TTS engine 14 embedded within the normalized input media 8. The number of ambiguous situations where the TTS engine 14 cannot deduct proper pronunciation should be minimized. Further more, abbreviations and acronyms should be expanded and punctuation properly set so that the text as spoken by the TTS engine 14 will have the proper message and intonation.

System 10 is configured to generate normalized input media 8 in a Speech Synthesis Markup Language (SSML) format which is an XML based W3C standard.

System 10 is configured to normalize input media 8 of a variety of media types, including: plain text, e-mail, HTML, XML, rich text format, portable document format, PS, GPS coordinates, RSS, SMS, MMS, video, and a multi-media link, for example. This list is continually evolving. Each input media 8 type and sub-type contain different contexts for interpreting information. Input media 8 may contain text data along with other data relating to context, formatting, visual presentation, and layout, for example. Input media 8 may contain text with punctuation, acronyms, abbreviations, ambiguities, short forms, informalities, different languages, symbols, grammatical errors, formatting errors, dates, phone numbers, etc. These factors introduce challenges, complications and complexities for text-to-speech engine 14 when converting text into synthetic audio.

For example, the input media 8 may be email. The nature of email, through its long legacy of usage as a context free text media for communication, introduces many challenges for systems aimed at analyzing email messages for different purposes including text synthesis. Informal writing style in emails, grammatical errors of the email authors and formatting errors introduced by email programs (or client applications) combine to make the text normalization process extremely complex.

Input media 8 may be an SMS message, which historically is limited to message lengths of 140 characters. This has resulted in a large number of short forms that have been commonplace. Examples include: c u l8r—See you later and lol—laugh out loud. As another example, an RSS baseball feed will include a vast number of baseball short forms for both team names, player names and many statistics. The short form "FT" can stand for foot, fort, financial times, fashion television, depending on the context of input media 8.

Creating and/or interpreting these input media 8 requires system 10 to determine metadata attributes for input media 8 such as, for example, the application type, context, subject matter, language, city/country and many other factors.

System 10 may improve the quality of the TTS engine 14 readback so that input media 8 are interpreted and read in a way that is more understandable to the user. For example, TTS engine 14 may read phone numbers back as 2 or 3 digit streams rather a large number. The phone number "2129175000" would be read as two-one-two pause nine-one-seven pause five thousand as opposed to 2 billion, one hundred and twenty nine million, one hundred and seventy five thousand or by single digits 2-1-2-9-1-7-5-0-0-0. Short forms such as RE: or FW: are interpreted as "regarding" or "forwarded", as another example.

As will be explained in detail herein, system 10 is configured to use machine learning techniques, rule engines, natural language processing, syntax parsing techniques and semantic parsing techniques in order to normalize input media 8. System 10 may employ an offline quality assurance agent for corrections and prepare a self learning agent to achieve the task of analyzing the text within input media 8, dividing it down to units of interest, such as phrases, preparing phrases, expanding strings to understandable natural language words and formatting the text data in SSML. The SSML code is then provided to TTS engine 14 for conversion into synthesized audio.

Figure 2:
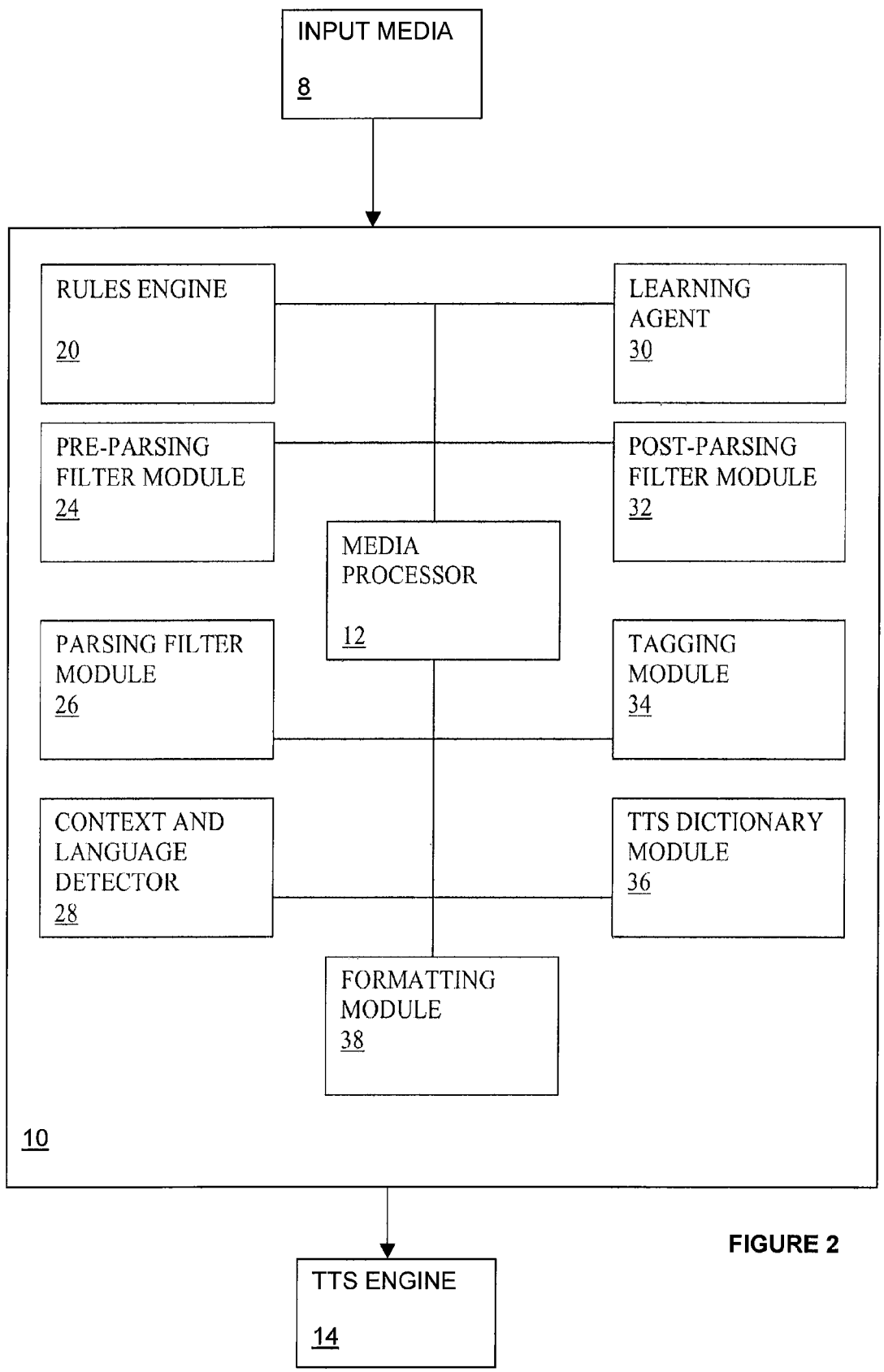
FIG. 2 is a block diagram of a system for normalizing input media in accordance with an example embodiment.

Referring now to FIG. 2, there is shown a block diagram of a system 10 for normalizing input media 8 for provision to a TTS engine 14 in accordance with an example embodiment. The example system 10 includes a media processor 12 which interconnects a rules engine 20, pre-parsing filter module 24, parsing filter module 26, context and language detector 28, learning agent 30, post-parsing filter module 32, tagging module 34, TTS dictionary module 36, and a formatting module 38.

Rules engine 20 is configured to maintain and update rules for processing the input media 8. The rules may include: pre-parsing rules, parsing rules, tagging rules, and post-parsing rules. Rules engine 20 may configure rules with an ambiguous case resolution mechanism. In response to detecting an ambiguity in the input media 8, the ambiguous case resolution mechanism uses the metadata attributes and statistical data to statistically resolve the ambiguity. Pre-parsing rules are used to check file headers, signatures, or formats to determine metadata attributes. Parsing rules are linked to metadata attributes and are used to extract content of interest (to be subject to audio synthesis) from the input media 8, and are also used to divide the content of interest into units of interest i.e. paragraphs, phrases, sentences and words. Tagging rules identify phrases and words that are to be modified by associating tags with the units of interest. Post-parsing rules are associated with tags and define how a unit of interest in the content should be modified. For example, a tagging rule will tag the word DR for expansion and a post-parsing rule will consider adjacent words to determine whether it should be expanded to DOCTOR or DRIVE, for example. System 10 may also be configured with exceptions to each of these rules and as system 10 learns new exceptions to rules may be added. These rule exceptions may be linked to specific application types.

Pre-parsing filter module 24 is configured to determine one or more metadata attributes using pre-parsing rules. Example metadata attributes are application type, default context, and default language. In some instances, the context and language cannot be determined at this stage, if it is not explicitly provided to system 10 for example, and instead will be determined by the context and language detector 28. The pre-parsing module 24 may be configured to determine metadata attributes by checking file formats, parsing/reading headers, reading signatures and comparing strings in the input media 8 to a set of dictionaries. The pre-parsing module 24 may be configured to determine metadata attributes by identifying tags (e.g. HTML tags), a fixed schema (e.g. RSS feed) or a format structure (e.g. email). A metadata attribute may be a default context (e.g. sports, news, financial) and the pre-parsing module 24 may be configured to determine the context based on the application type. A metadata attribute may be a default language (e.g. English, French) and the pre-parsing module 24 may be configured to determine the default language based on language identifying metadata in the header or signature, or application type.

Pre-parsing module 24 may be configured to determine the one or more metadata attributes by applying different test rules to the input media 8; computing a value for each test rule applied; determining which test rule computed the highest score; and using the test rule with the highest score to determine the one or more metadata attributes. Upon determining that two or more test rules have the same highest score, the pre-parsing module 24 may be further configured to apply a default priority list to determine which of the two or more test rules to use to determine the metadata attributes.

Parsing filter module 26 is configured to query the rules engine 20 for parsing rules associated with the one or more metadata attributes identified in pre-parsing and to identify content of interest, such as a text, video, or audio component (or a combination thereof), from the input media 8 using the parsing rules. The content of interest will be subject to audio synthesis by the TTS engine 14.

Context and language detector 28 is configured to determine a default context from a plurality of contexts and a default language from a plurality of languages for the text component. Example contexts include financial, addresses, sports, and news. The context and language detector 28 determines the default context by computing, for each context, an aggregate score for the text component using a context model by searching for the text component for a set of words linked to specific contexts.

The context model defines, for each context, a list of strings and associated scores. The default context is the context with the highest aggregate score for the text component.

For example, the context model can have a set of words used in a medical, financial or legal literature and score the text or other media by counting the utterances of those words. If any of those scores hits a minimum configurable threshold (itself being a rule in the rules engine) the context is set as the highest score context or a combination of contexts with a priority based on the score.

For example in text below the text will match the italic words in the set of financial context domain words. Having 4 high score words in a sentence will cause the context to be set if the threshold is configured to do so.

"Wall Street was set to close out its best week in six on Friday after recent economic data, including a stronger-than-expected jobs report, showed the U.S. economy may be in better shape than thought."

Depending on the configuration of the threshold, if the media is the following sentence with two matching words, it might also be tagged financial context "Wall Street is a street in New York City which runs through the financial district"

The context and language detector 28 may be further operable to detect a local language for one or more phrases and strings of the text component, where the local language is different from the default language.

As an example, pre-parsing filter module 24 and context and language detector 28 are configured to detect context and application type using a Simple API for XML (SAX) XML parser and add tags into a text file and count the match of tags to detect known application type, and then context. A simple most score count is used given that score surpasses a minimum ratio (depending on the length of input; if input length is too small then system 10 is configured to use a default (e.g. email, general). If the language is not explicitly provided, then the context and language detector 28 is configured for language detection based on the method for comparing two language identification schemes introduced at http://www.xrce.xerox.com/Research-Development/Publications/1995-012. Context and language detector 28 is configured to use data from the European Parliament Proceeding Parallel Corpus described at http://www.statmt.org/europarl/ to feed the filter and match the language at a phrase, paragraph or entire text level.

Learning agent 30 is configured to divide the text component into units of interest, such as paragraphs, phrases, sentences, and strings. Learning agent 30 is configured to divide the text component into units of interest using parsing rules based on punctuation, and also based on a pre-configured number of words. For example, a parsing rule may specify that 15 or 25 words indicate a phrase, where a phrase is a unit of interest.

Tagging module 34 is configured to query the rules engine 20 for tagging rules associated with the default context and the default language and to iteratively assign tags to the phrases and strings using the tagging rules. Each tag assigned by the tagging module 34 is associated with a post-parsing rule. Each tag assigned by the tagging module 34 may also be associated with a confidence score. The tagging module 34 may be configured to iteratively assign the tags until no more tagging rules apply or until a maximum limit of tags per word is reached. The tagging module 34 may be configured to query the rules engine for tagging rules associated with the local language, in addition or alternative to the default language.

Tagging module 34 and tagging rules may be configured by training language models based on the following example toolkits: the SRI language modeling toolkit for building and applying statistical language models for speech recognition, statistical tagging and segmentation, and machine translation (http://www.speech.sri.com/projects/srilm); the Carnegie Mellon University-Cambridge Statistical Language Modeling Toolkit to facilitate language modeling and process text data into word frequency lists and vocabularies, word bigram and trigram counts and related statistics, perplexity, Out-Of-Vocabulary rate, distribution of Backoff cases, and annotation of test data with language scores (http://svr-www.enq.cam.ac.uk/%7Eprc14/toolkit_documentation.html); and the Edinburgh Speech Tools Library of a software library and a set of programs which use the library including a speech class, linguistics class, audio playback, signal processing, statistical functions, grammar, intonation, speech recognition, and utility functions and classes (http://www.cstr.ed.ac.uk/projects/speech_tools/manual-1.2.0/). As another example, ready to use language models such as those distributed by the European Language Resource Association (http://www.elra.info/Distribution-of-your-LRs.html) may be used.

Post-parsing filter module 32 is configured to modify the content component by executing the post-parsing rules identified by the tags assigned to the units of interest, such as phrases and strings. When two or more tags conflict the post-parsing filter module 32 is configured to execute the post-parsing rule associated with the tag with the highest confidence score.

As an illustrative example, the phrase: "Dr. Birnbaum's drive to the patient at 31 Apfelbaum Dr. took him 30 mins." will get expanded with the help of tagging, assuming the language has been detected correctly. The tags for "Birnbaum" and "Apfelbaum" including their tag as "proper name" and part of speech tag of these words as well as their relative position to the "Dr." token helps the expansion of the token having it tagged as an "abbreviation" itself for the word Doctor, instead of the word Drive, for example.

The context and language detector 28, learning agent 30 and post-parsing filter module 32 are configured to iteratively process the text component and modifications thereto until there are no further modifications or a threshold number of iterations are performed.

TTS dictionary module 36 is configured to process common literals in the content component when TTS output would have been wrong otherwise. This usually is a changing set depending on the literature and new words in each context. For example, words like "facebook" or "twitter" might need to be added to such a dictionary if the dictionary is for languages other than English to have the proper pronunciation at the end. Formatting module 38 is configured to convert the content component to speech synthesis markup language text with embedded speech directives. TTS engine 14 is configured to convert the speech synthesis markup language text to speech signals (synthesized audio) and transmit the speech signals to a telephone or computing device associated with a user of system 10.

System 10 may also include a quality assurance agent that is prompted to resolve an ambiguity in the event the ambiguity cannot be resolved statistically within a pre-configured minimum level of confidence.

Figure 3:
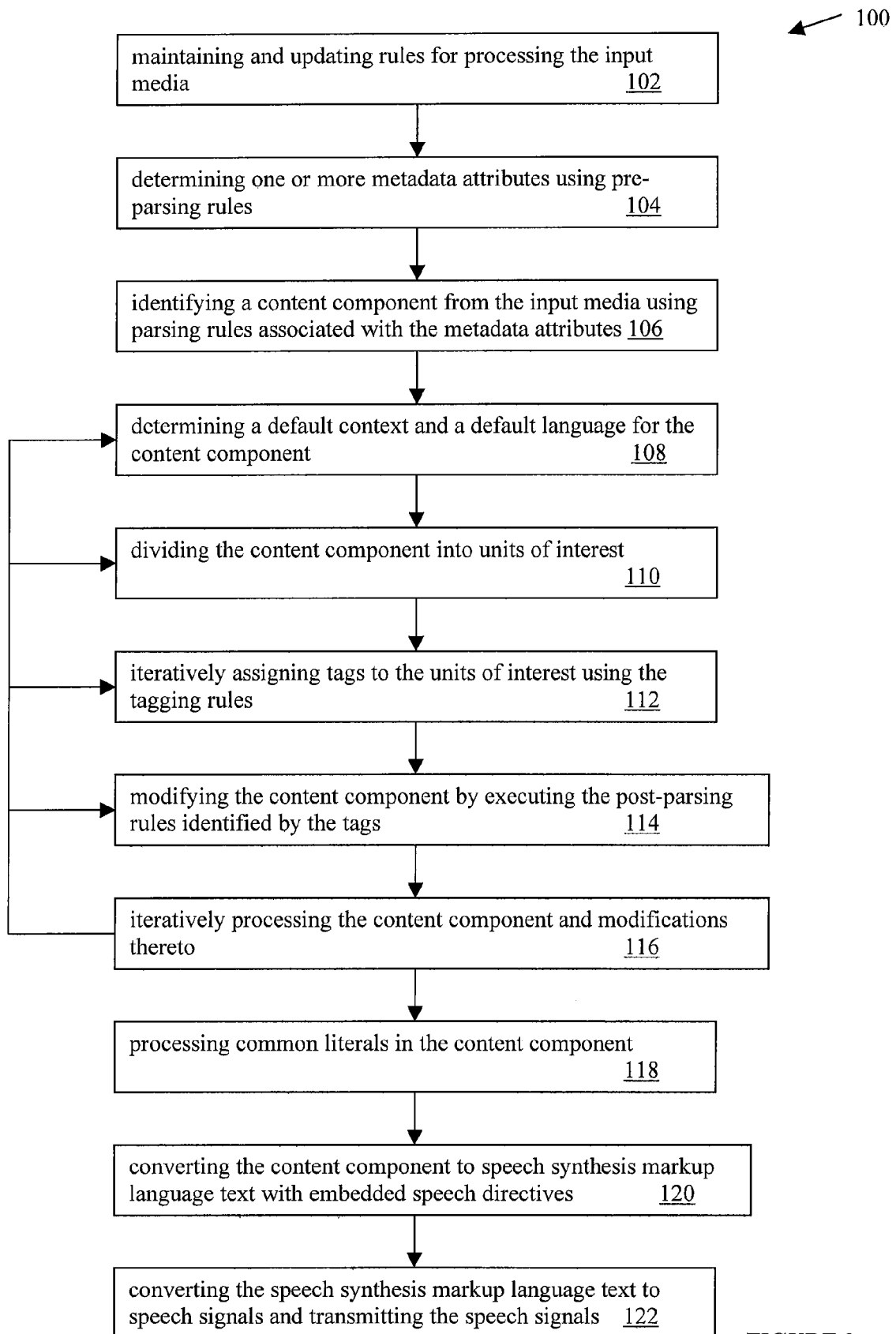
FIG. 3 is a flowchart diagram of a method for normalizing input media in accordance with an example embodiment.

Referring now to FIG. 3, there is illustrated a flowchart diagram of a method 100 for normalizing input media 8 in accordance with an example embodiment. System 10 receives input media 8 and provides to media processor 12 for normalization.

At step 102, rules engine 20 maintains and updates rules for processing the input media 8, wherein the rules comprise pre-parsing rules, parsing rules, tagging rules, and post-parsing rules. Rule engine 20 may configure each rule and set of rules with an ambiguous case reporting mechanism. This mechanism uses statistical data gathering to train the rules engine 20. For example if ERA when used in a sports context is ambiguous, the engine can determine that statistically ERA will mean Earned Run Average as opposed to Average Number of Errors. This self learning mechanism will improve decisions using real-time information based on large sample selection. Users are provided with the capability to customize the rules, add new rules, and/or change the order of rule application. Users can effectively generate their own narrative approach.

At step 104, media processor 12 queries pre-parsing filter module 24 to determine one or more metadata attributes using pre-parsing rules, wherein one metadata attribute is an application type. Media processor 12 is configured to query rules engine 20 for pre-parsing rules. The pre-parsing rules may assist media processor 12 in determining metadata attributes based on the structure of the input media. Metadata attributes are data about the input media 8 and may assist in text extraction and normalizing. For example, a metadata attribute may identify the input media 8 as HTML. For HTML, three extra spaces might mean nothing from the perspective of audio synthesis but for a format such as the rich text format, three spaces may indicate a column delimiter in a table, which will require special treatment for audio synthesis.

Media processor 12 processes input media 8 to obtain or deduce metadata attributes about the input media 8. The aim of this step is to extract as much information as possible about the input media 8 for use by the other modules of system 10.

Metadata attributes may be embedded within the input media 8, linked thereto, or otherwise deduced by system 10. For example, input media 8 may be a web page, which includes metadata attributes in the form of metatags. Description and keyword metatags are used to describe the web page's content. A search engine may use this data when adding pages to their search index and these metatags will be accessible to system 10. For some content and application types, system 10 may store standard metadata attributes.

Media processor 12 may process the input media 8 a number of times depending on different metadata attributes. For example, an email containing a link to Toronto Maple Leafs may be processed as email but also as sports or hockey content.

Media processor 12 works based on a dynamic set of metadata attributes. Based on each metadata attribute or a collection set of such metadata attributes, the order of rule application is determined and each set of rules is then applied to the input media 8. These rules are dynamically added or updated in real-time by rule engine 20 so that the updated rules are used, such as the latest spelling or expansion configuration.

One metadata attribute is an application type or format, where each application type is associated with a set of rules. The application type may also be determined using a set of rules.

Application types include: plain text, e-mail, HTML, XML, rich text format, portable document format, PS, GPS coordinates, RSS, SMS, MMS, video, and a multi-media link, for example. The application type identifies a set of rules and associated processing tasks defined to be applied to the input media 8 of that type. Such a set of rules, and hence the application types themselves, can be added to the rules engine 20 dynamically to cover future different media and context.

For example a rule entry will trigger an RFC822 message parser for validating of a message as an email and score it as such, or a MMS parser will try parsing a binary MMS. In such cases usually one rule will have a much higher score and clearly indicate the application type. However, for cases like the distinction between XML and HTML it might be closer score; an HTML document, being essentially an XML document, is determined as HTML if tags are identified as HTML tags. The document is otherwise identified as XML if a simple SAX Parser can parse the document as an XML document (to merge with below 52-55).

The application type may not directly be provided to system 10 and, in such case, the media processor 12 can indirectly determine the application type using different test rules for all applications and obtain a score for each type. The highest score defines the application type and in case of equal scores, a default priority list defines the application type.

Media processor 12 is configured to parse input media 8 and identify special characteristics. For example, media processor 12 may detect email characteristics and determine that the input media 8 is a standard email. Even if the application type is not explicitly provided, it will be identified as such.

Media processor 12 is configured to parse input media 8 to determine whether it supports a valid format. As an example, a HTML document may comply with standard HTML format, and if media processor 12 detects that the input media 8 complies with standard HTML format then media processor 12 will determine that the application type is HTML.

Media processor 12 may use a test rule to determine the application type. For example, if media processor 12 cannot parse input media 8 to determine whether it complies with the standard HTML format, then media processor 12 is configured to apply a test rule for HTML. The HTML test may be based on detecting a specific number of HTML tags embedded in input media 8. If media processor 12 determines that input media 8 scores high it may determine that the application type is HTML based on a test rule.

Media processor 12 may use a priority list to determine the application type. For example, if media processor 12 cannot parse input media 8 to determine whether it complies with any valid standard format, then media processor 12 is configured to apply test rules. In the event the scores for a test rule for HTML and a test rule for XML equal (some HTML tags are identified but some tags are also identified which are not known HTML tags, for example), then media processor 12 is configured to use a priority list to determine that the application type of the input media 8 is XML.

Each application type might be associated with a different set of rules. For example, while HTML parsing will be non-validating and spacing be ignored, the plain text spacing will be used to generate pauses. In another example, if the application type is email, the header information is used as a reference to expand body information. If the sender is John Smith and the final line of body is JS, then JS will be expanded to "John Smith".

Another metadata attribute is language. The media processor 12 is configured to process input media 8 in multiple languages, including regional language variances (e.g., Parisian French and Quebec French). The media processor 12 is configured to detect one or more languages for input media. For example, media processor 12 is configured to test each defined section (e.g. sentence in an email or paragraph in html page) to detect the language. If no language information is provided in formatting and layout, media processor 12 is configured to use a bloom filter to score the input media 8 against a set of language dictionaries to detect the language statistically. If no language could be deducted applying the rules, a default language is used and the input media 8 is marked for human agent correction/review. The review result will assist the language detection mechanism in media processor 12 to improve its dictionaries for better future performance.

Another metadata attribute is context. If known, the context of the input media 8 can assist media processing 12 in locating proper context dictionary and rules to expand abbreviations, acronyms, phone numbers, dates, etc. For example an RSS feed from a traffic content provider will provide the context attribute as "traffic". Hence acronyms such as hwy—Highway, N—North are readily determined. In the same way, context attributes can be obtained for most classes of content, including: financial news, sports, weather, regional news, politics, and specific technologies.

Other Metadata attributes and set of rules associated with them can be defined depending on the application. For example a specific application being a transcribed video with in-line subtitles in language X of a specific type will be identified as such having its associated rules setup in a way that the media of interest getting extracted are the subtitles to generate the synthesis in language X.

At step 106, media processor 12 queries parsing filter module 26 to identify a content component (text, video, audio, and combination thereof) from the input media 8 using parsing rules associated with the metadata attributes. Parsing filter module 26 is configured to extract the content component to be converted to audio from the input media 8 using parsing rules. The result is a media component which has the format information and metadata attributes removed and includes only the content that will be subject to audio synthesis.

At step 108, media processor 12 queries context and language detector 28 to determine, for the text component, a default context from a plurality of contexts and a default language from a plurality of languages. System 10 determines the default context by computing, for each context, an aggregate score for the text component using a context model. The context model defines, for each context, a list of strings and associated scores, where the default context is the context with the highest aggregate score for the text component. Context and language detector 28 is configured to use a bloom filter and dictionary hashing to statistically detect language (e.g. English, French, Italian) and the context (e.g. medical, professional, news, financial, sports, weather). The context and language may be detected before and after the content component is divided into sentences and phrases by learning agent 30, so that this may be done on the content as a whole and also on an individual sentence and phrase basis. The language and context assist media processor 12 in determining which tags and post-parsing rules to apply and in which order.

At step 110, media processor 12 queries learning agent 30 to divide the content component into units of interest, such as paragraphs, phrases of strings. For example, learning agent 30 may be configured to break the content component into paragraphs, and then into sentences, phrases and strings based on punctuation (original or deducted), line breaks, length of a line, and number of words. If the input media 8 is email or SMS, the usual lack of or wrong punctuation introduces areas of heuristics for phrase decomposition. Learning agent 30 may be configured to consider a line with around 15 words as a phrase, otherwise learning agent 30 may concatenate the line with the next line. Extra empty lines will be removed.

At step 112, media processor 12 queries tagging module 34 to iteratively assign tags to the units of interest using the tagging rules associated with the default context and the default language. Each tag is associated with a post-parsing rule to define how the unit of interest, such as words (or adjacent words) or phrase, should be modified.

At step 114, media processor 12 queries post-parsing filter module 32 to modify the text component by executing the post-parsing rules identified by the tags assigned to the phrases and strings. For example, post-parsing filter module 32 is configured to expand abbreviations and acronyms on a dynamic iterative basis. Media processor 12 determines what post-parsing rules to apply and in what order based on the tags, context, language, metadata attributes and other deduced data. The post-parsing rules apply to phrases and strings separately. The exceptions should be listed before the general rules in the priority list.

At step 116, the media processor 12 queries context and language detector 28, tagging module 34, learning agent 30 and post-parsing filter module 32 to iteratively process the content component and modifications thereto until there are no further modifications or a threshold number of iterations are performed.

At step 118, the media processor 12 queries TTS dictionary module 36 to process common literals in the content component.

At step 120, the media processor 12 queries the formatting module 38 to convert the text component to speech synthesis markup language text with embedded speech directives. The media processor 12 provides the speech synthesis markup language text to the TTS engine 14.

At step 122, the TTS engine 14 converts the speech synthesis markup language text to speech signals and transmits the speech signals.

Based on metadata attributes, such as the format, context and language, the media processor 12 uses a set of rules from the rule engine 20 to decompose the original content, normalize the format to extract content of interest, convert that to paragraphs, phrases and sentence. For example, the lack of or wrong punctuation in email communication in today's email correspondence introduces areas of heuristic for this phrase decomposition. Using these metadata attributes a language model, along with formatting information helps media processor 12 correct punctuations to reach a better phrase decomposition.

Final normalization is token-based to prepare abbreviation and acronym expansion on a dynamic ongoing basis along with providing the users with the possibility to customize the rules, add to then, change the order of applying those rules and hence effectively generate own narrating approach.

As an illustrative example, consider a sample email as the input media 8:

c) Other tags that are not standard HTML tags (<QOT> and </QOT>) and that are not part of the plain text version. Media processor 12 will drop these tags from the body and generate a report entry for offline review. The results of the offline review may lead media processor 12 to generate a pre-parsing rule to add them as valid tags with associated break down rules. For now they are ignored.

Parsing filter module 26 uses parsing rules associated with e-mail in order to use the HTML tags and the rule sets for the sequence of tags to break down the input to paragraphs and phrases. The result is a text component that has the format information and metadata removed and only includes text to be subject to audio synthesis. Because of the <br> tags and information they provide, there will not be confusion that a

```
IME-Version: 1.0
Received: by 10.231.35.67 with HTTP; Wed, 7 Apr 2010 17:26:48 –0700 (PDT)
Date: Mon, 5 Apr 2010 20:26:48 –0400
Delivered-To: John Smith <js@acme.com>
Message-ID: <x2we4feaf7a1004071726xb05f202eq7e4e7638b6afa45e@mail.gmail.com>
Subject: PPT drafts for TS presentation tomorrow
From: John Doe <jd@acme.com>
To: John Smith <js@acme.com>
CC: Tom Sawyer <ts@acme.com>
To: Jean Doe <jeand@acme.com>
Content-Type: multipart/mixed; boundary=00221504666f0117180483aebce2
--00221504666f0117180483aebce2
Content-Type: multipart/alternative; boundary=00221504666f0117120483aebce0
--00221504666f0117120483aebce0
Content-Type: text/plain; charset=ISO-8859-1
Hi JS/Jean,
Please start with this one not
sure TS has seen the previous
draft of the presentation
<TS>
Idea: discuss using new header info to expand body
</TS>
/JD
----
Checked by ABC Antivirus. Footer info
--00221504666f0117120483aebce0
Content-Type: text/html; charset=ISO-8859-1
Please start with this one<br><br><br>not sure TS has seen the previous draft
of presentation<br>
<br><br><QOT><TS>Idea: discuss using new header info to expand
body</TS></QOT>
<br><br><br>/JD<br>----<br>
Checked by ABC Antivirus. Footer info<br>
--00221504666f0117120483aebce0--
```

Media processor 12 will normalize the above email as follows.

Pre-parsing filter module 24 determines one or more metadata attributes using pre-parsing rules. In this example, pre-parsing filter module 24 uses the pre-parsing rules to identify this input media 8 as an email based on the header and body structure. Further inside the email, the alternative email body provides both a text/plain and text/html version of the email. Media processor 12 can extract additional metadata attributes and other information from the HTML so that format will take precedence over plain text.

Pre-parsing filter module 24 may identify three types of HTML tags in the HTML body:

a) Standard HTML tags that learning agent 30 is configured to use to break down the text to phrases;

b) Non-standard HTML tags (<TS> and </TS>). When pre-parsing filter module 24 detects non-standard tags then it will also check the plain text version of the e-mail for their existence. If they exist in the plain text version then this will indicate these tags are text content;

plain/text only version above would have been different at the phrase extraction step and the results will be:

```
Please start with this one
not sure TS has seen the previous draft of the presentation
<TS>
Idea: discuss using new header info to expand body
</TS>
/JD
----
Checked by ABC Antivirus. Footer info
```

Context and language detector 28 is configured to use dictionaries to determine that the language is English.

Parsing filter module 26 is further configured to apply whole text filters where the text component as a whole is the subject of the filters. The footer elimination filter (removing whatever after specific strings), removing of voice file URLs, filtering phone numbers and email addresses in the body are done on the whole text and not each phrase basis. The simple sample above would lead to:

```
Please start with this one
<TS>
Idea: discuss using new header info to expand body
</TS>
/JD
```

Learning agent 30 is configured to extract units of interest such as sentences, phrases and strings from text component. Learning agent 30 is configured to determine sentences by punctuation. In the absence of the punctuation, learning agent 30 is configured to use a language model along with line breaks and the length of a line to decide if the line is to be considered as a phrase or get concatenated with the line after it. Currently the 80-20 rule is to consider lines less than 50 characters as sentences and not concatenate them. Extra empty lines will be removed too.

For the sample e-mail example, learning agent 30 is configured to use a language model to identify the first sentence, the second phrase will be extracted by line rules and the line break will avoid attaching the signature to the last line.

Tagging module 34 is configured to tag each word in the remaining text component. Context and languages detector 28 is configured to use a bloom filter (dictionary hashing) to statistically detect the context the language for the whole text component, as well as for each individual sentence/phrase.

Further based on the detected language model, tagging module 34 iteratively assigns a first round tags to each word (i.e. setting part of speech or flags as possible acronym, abbreviation or other ambiguous strings). The context helps post-parsing filter module 32 decide which post-parsing filter rules should apply based on the combination of the language and context/domain (e.g. medical, professional, financial etc). Tagging module 34 is configured to use tag words in further rounds of tagging based on which set of such filter rules applies to the text component. For example, the post-parsing filter module 32 applies acronym rules and exceptions to them. These rules apply on each sentence or phrase separately. The exceptions should be listed before the general rule as the filter list is a priority list. Format related information might lead to extra tags. That is, "JD" in the above text might have a candidate tag of (abbr. Junior Director) but format information (Email header from jd@acme.come) matches "JD" produces a higher score value tag (signature: John Doe).

Tagging module 34 is configured to continue the tagging process until no further tags can be added or the number of tags per word has reached the "n-best" set limit. Each tag has a score based on the confidence of the rule setting for each tag. Tagging module 34 is configured to sort the tags for each word based on the scores for the word. Tagging module 34 dynamically adds the set of tags and actions for each sequence of tags and/or a single tag to the rules engine 20.

Each tag is associated with a post-parsing rule, which defines an action to be executed by post-parsing filter module 32. Post-parsing filter module 32 is configured to modify the text component by executing the post-parsing rules identified by the tags assigned to the phrases and strings. When the post-parsing filter module 32 selects post-parsing rules (to execute the corresponding action), the maximum number of matching tags (associated with post-parsing rules) is selected. For example, assume the following situation:

action A corresponds to tag A
    action AB for a sequence of tags A and B and
    two consecutive words are tagged AB in the text Post-parsing filter module 32 is configured to apply action AB to the two words tagged AB. Even though tag A is present, post-parsing filter module 32 may not apply action A if the rules conflict, or may apply action A in a later iteration.

Based on the rules defining actions for each tag, post-parsing filter module 32 expands the sentences and phrases. As an example, for this situation, post-parsing filter module 32, based on the domain with highest score, expands "TS" to "Top Secret":

```
Please start with this one
not sure Tom Sawyer has seen the previous draft of the presentation
Top Secret Idea: discuss using new header info to expand body
<break/>John Doe<break/>
```

At this step, if an unsolved ambiguity still exists, tagging module 34 and post-parsing filter module 32 will process the resulting text before adding pronunciation tags until either: (i) a max number of iterations are done or (ii) no further changes deducted in a loop.

Formatting module 38 is configured to convert the text component to speech synthesis markup language text with embedded speech directives.

```
<p><s>Please start with this one</s>
<s>not sure Tom Sawyer has seen the previous draft of the presentation</s>
<s>Top Secret Idea: discuss using new header info to expand body</s>
</p>
<break/>John Doe<break/>
```

A TTS dictionary module 36 is configured to process common literals in the text component using a TTS dictionary. These generally have one single pronunciation per part of speech function and it is different from the one TTS itself would generate. For example, words like "gmail" (pronounced "Gee-Mail") and most imported proper nouns are handled in this step.

Finally, the normalized input media 8 is provided to TTS engine 14 which is configured to convert the speech synthesis markup language text to speech signals and transmit the speech signals to the user, via a computing device for example.

The above process might have led to multiple unresolved ambiguity reports by different rules. In the event of unresolved ambiguity reports, tagging module 34 is configured to include <QOT> tags which when processed by system 10 prompts review by a Quality Assurance agent. The Quality Assurance agent reviewing the report can add a rule identifying <QOT> as "quoting a person" and adding proper rules that would lead to the correct expansion at step above for similar emails in future.

Assuming the same email is sent after such a rule is added, then the expansion of TS to Top Secret may be revised to Tom Sawyer, given the context of the email, will lead to the final text to:

```
<p><s>Please start with this one</s>
<s>not sure Tom Sawyer has seen the previous draft of the presentation</s>
<s> Tom Sawyer said: discuss using new header info to expand body</s>
</p>
<break/>John Doe<break/>
```

Rules engine 20 is configured to maintain and update rules for processing the input media, wherein the rules comprise pre-parsing rules, parsing rules, tagging rules, and post-parsing rules. The following are example rules for emails. For this example, tags are simply numbers (i.e. if a string or phrase is assigned to 25, 37 and 87 rules with those numbers will be applied to it).

```
play.email.pre.parse.filters = 1,2,3,4,5,6,7,8,9,10,11,12,13,14,15,16,17,18,19,20
play.email.post.parse.filters =
21,21,22,23,24,25,26,27,28,29,30,31,32,33,34,35,36,37,38,39,40,41,42,43,
44,45,46,47,48,49,50,51,52,53,54,55,56,57,58,59,60,61,62,63,64,65,66,67,
68,69,70,71,72,73,74,75,76,77,78,79,80,81,82,83,84,85,86,87,88,89,90,91,
92,93,94,95,96,97,98,99,100,101,102,103,104,105,106,107,108,109,110,
111,112,113,114,115,116,117,118,119,120,121,122,123,124,125,126,127,
128,129,130,131,132,133,134,135,136,137,138,139,140,141,142,143,144,
145,146,147,148,149,150,151,152,153,154,155,156,157,158,159,160,161,
162,163,164,165,166,167,168,169,170,171,172,173,174,175,176,177,178,
189,180,181,182,183,184,185,186,187,188,189,190,191,192,193,194,195,
196,197,198,199,200,201,202,203,204,205,206,207,208,209,210,211,212,
213,214,215,216,217,218,219,220,221,222,223,224,225,226,227,228,229,
230,231,232,233,234,235,236,237,238,239,240,241,242,243,244,245,246,
247,248,249,250,251,252,253,254,255,256,257,258,259,260,261,262,263,
264,265,266,267,268,269,270,271,272,273
########### Pre Parse Filter
content.filter.pattern.1 =
   content.filter.replacement.1 = <BR>
content.filter.pattern.2 = C\#
content.filter.replacement.2 = \ C-sharp
#content.filter.pattern.3 = J\#
#content.filter.replacement.3 = \ J-sharp
content.filter.pattern.3 = \\.+
content.filter.replacement.3 = .
#content.filter.pattern.4 = ∞C
#content.filter.replacement.4 = \ Celsius
content.filter.pattern.4 = \\!+
content.filter.replacement.4 = !
#content.filter.pattern.5 = ∞F
#content.filter.replacement.5 = \ Fahrenheit
content.filter.pattern.5 = \\=+
content.filter.replacement.5 = =
#content.filter.pattern.6 = S.O.S
#content.filter.replacement.6 = \ S O S
content.filter.pattern.6 = \\@+
content.filter.replacement.6 = @
#content.filter.pattern.7 = s.o.s
#content.filter.replacement.7 = \ S O S
content.filter.pattern.7 = \\ +
content.filter.replacement.7 = \
#content.filter.pattern.8 = L.A.
#content.filter.replacement.8 = \ L A
content.filter.pattern.8 = \\?+
content.filter.replacement.8 = ?
#content.filter.pattern.9 = (^|[\ \s+])N.A.
#content.filter.replacement.9 = \ N A
content.filter.pattern.9 = \\:+
content.filter.replacement.9 = :
#content.filter.pattern.10 = (^|[\s+])N.V.
#content.filter.replacement.10 = \ N V
content.filter.pattern.10 = \\;+
content.filter.replacement.10 = ;
content.filter.pattern.11 = J.P.
content.filter.replacement.11 = \ J P
#-------------------
#measuring
#-------------------
content.filter.pattern.12 = kg\\/l
content.filter.replacement.12 = \ kg per liter
content.filter.pattern.13 = m\\/s
content.filter.replacement.13 = \ meter per second
content.filter.pattern.14 = km\\/s
content.filter.replacement.14 = \ km per second
content.filter.pattern.15 = feet\\/s
content.filter.replacement.15 = \ feet per second
content.filter.pattern.16 = miles\\/s
content.filter.replacement.16 = \ miles per second
##There is bug in these items
##Doman name for countries
##.gr #Greece
##.hr #Croatia
##.kg #Kyrgyzstan
##.lb #Lebanon
romane@cablesedge.gr
content.filter.pattern.17 = \\.gr
content.filter.replacement.17 = \ dot G R
#content.filter.pattern.18 = \\.hr
#content.filter.replacement.18 = \ dot H R
#content.filter.pattern.19 = \\.kg
#content.filter.replacement.19 = \ dot K G
#content.filter.pattern.20 = \\.lb
#content.filter.replacement.20 = \ dot L B
########### Post Parse Filter
content.filter.pattern.21 = ([0-9]+)ish
content.filter.replacement.21 = (_%%1%%) ish
content.filter.pattern.22 = ([0-9]+)[\\s]?MB
content.filter.replacement.22 = (_%%1%%_) megabyte
content.filter.pattern.23 = ([0-9]+)[\\s]?GB
content.filter.replacement.23 = (__%%1%%____) gigabyte
content.filter.pattern.24 = (^|[\\s+])AFK([\\W+]|[\\s+]|$)
content.filter.replacement.24 = \ Away From Keyboard
content.filter.pattern.25 = (^|[\\s+])BAK([\\W+]|[\\s+]|$)
content.filter.replacement.25 = \ Back At Keyboard
content.filter.pattern.26 = (^|[\\s+])BBFN([\\W+]|[\\s+]|$)
content.filter.replacement.26 = \ Bye Bye For Now
content.filter.pattern.27 = (^|[\\s+])BBL([\\W+]|[\\s+]|$)
content.filter.replacement.27 = \ Be Back Later
content.filter.pattern.28 = (^|[\\s+])BBSL([\\W+]|[\\s+]|$)
content.filter.replacement.28 = \ Be Back Sooner or Later
content.filter.pattern.29 = (^|[\\s+])BBS([\\W+]|[\\s+]|$)
content.filter.replacement.29 = \ Be Back Soon
content.filterpattern.30 = (^|[\\s+])BCNU([\\W+]|[\\s+]|$)
content.filter.replacement.30 = \ Be Seeing You
content.filter.pattern.31 = (^|[\\s+])BCOZ([\\W+]|[\\s+]|$)
content.filter.replacement.31 = \ Because
content.filter.pattern.32 = (^|[\\s+])BEOS([\\W+]|[\\s+]|$)
content.filter.replacement.32 = \ Nudge
content.filter.pattern.33 = (^|[\\s+])BFN([\\W+]|[\\s+]|$)
content.filter.replacement.33 = \ Bye For Now
content.filter.pattern.34 = (^|[\\s+])BKA([\\W+]|[\\s+]|$)
content.filter.replacement.34=\ Better Known As
content.filter.pattern.35 = (^|[\\s+])BRB([\\W+]|[\\s+]|$)
content.filter.replacement.35 = \ Be Right Back
content.filter.pattern.36 = (^|[\\s+])BRT([\\W+]|[\\s+]|$)
content.filter.replacement.36 = \ Be Right There
content.filter.pattern.37 = (^|[\\s+])BUAYA([\\W+]|[\\s+]|$)
content.filter.replacement.37 = \ To Sweet Talk You
content.filter.pattern.38 = (^|[\\s+])CFV([\\W+]|[\\s+]|$)
content.filter.replacement.38 = \ Call For Vote
content.filter.pattern.39 = (^|[\\s+])CUL8R([\\W+]|[\\s+]|$)
content.filter.replacement.39 = \ See You Later
content.filter.pattern.40 = (^|[\\s+])CUL([\\W+]|[\\s+]|$)
content.filter.replacement.40 = \ See You Later
content.filter.pattern.41 = (^|[\\s+])CYA([\\W+]|[\\s+]|$)
content.filter.replacement.41 = \ Cover Your Ass
content.filter.pattern.42 = (^|[\\s+])DMI([\\W+]|[\\s+]|$)
content.filter.replacenient.42 = \ Don't Mention It
content.filter.pattern.43 = (^|[\\s+])DOD([\\W+]|[\\s+]|$)
content.filter.replacement.43 = \ We could tell you but then we'd have to kill you!
content.filter.pattern.44 = (^|[\\s+])DUCT([\\W+]|[\\s+]|$)
```

-continued

```
content.filter.replacement.44 = \ Did You See That?
content.filter.pattern.45 = (^|[\\s+])DYoFDW([\\W+]|[\\s+]|$)
content.filter.replacement.45 = \ Do Your Own Flipping Dirty Work
content.filter.pattern.47 = (^|[\\s+])FAQL([\\s]W)
content.filter.replacement.47 = \ Frequently Asked Questions List
content.filter.pattern.46 = (^|[\\s+])F2F([\\s]W)
content.filter.replacement.46 = \ Face to Face
content.filter.pattern.48 = (^|[\\s+])FAQ([\\s]W)
content.filter.replacement.48 = \ Frequently Asked Questions
content.filter.pattern.49 = (^|[\\s+])FAWC([\\s]W)
content.filter.replacement.49 = \ For Anyone Who Cares
content.filter.pattern.50 = (^|[\\s+])FOAF([\\s]W)
content.filter.replacement.50 = \ Friend Of A Friend
content.filter.pattern.51 = (^|[\\s+])FTASB([\\s]W)
content.filter.replacement.51 = \ Faster Than A Speeding Bullet
content.filter.pattern.52 = (^|[\\s+])FTF([\\W+]|[\\s+]|$)
content.filter.replacement.52 = \ Face To Face
content.filter.pattern.53 = (^|[\\s+])FTL([\\W+]|[\\s+]|$)
content.filter.replacement.53 = \ Faster Than Light
content.filter.pattern.54 = (^|[\\s+])FUBAR([\\W+]|[\\s+]|$)
content.filter.replacement.54 = \ Fed Up Beyond All Recognition
content.filter.pattern.55 = (^|[\\s+])FWIW([\\W+]|[\\s+]|$)
content.filter.replacement.55 = \ For What It's Worth
content.filter.pattern.56 = (^|[\\s+])FYA([\\W+]|[\\s+]|$)
content.filter.replacement.56 = \ For Your Amusement
content.filter.pattern.57 = (^|[\\s+])GALGAL([\\W+]|[\\s+]|$)
content.filter.replacement.57 = \ Give A Little Get A Little
content.filter.pattern.58 = (^|[\\s+])GBH([\\W+]|[\\s+]|$),
content.filter.replacement.58 = \ Great Big Hug
content.filter.pattern.59 = (^|[\\s+])YMMV([\\W+]|[\\s+]|$)
content.filter.replacement.59 = \ Your Mileage May Vary
content.filter.pattern.60 = (^|[\\s+])YTTDSFATCCSH([\\W+]|[\\s+]|$)
content.filter.replacement.60 = \ Yours Till The Desert Sands Freeze And The Camels Come Skating Home
content.filter.pattern.61 = (^|[\\s+])YWIA([\\W+]|[\\s+]|$)
content.filter.replacement.61 = \ You're Welcome In Advance
content.filter.pattern.62 = (^|[\\s+])ZZZ([\\W+]|[\\s+]|$)
content.filter.replacement.62 = \ Sleeping, Bored, Tired
content.filter.pattern.63 = (^|[\\s+])GR8([\\W+]|[\\s+]|$)
content.filter.replacement.63 = \ Great
content.filter.pattern.64 = (^|[\\s+])HIH([\\W+]|[\\s+]|$)
content.filter.replacement.64 = \ Hope It Helps
content.filter.pattern.65 = (^|[\\s+])HILIACACLO([\\W+]|[\\s+]|$)
content.filter.replacement.65 = \ Help I Lapsed Into A Coma And Can't Log Off
content.filter.pattern.66 = (^|[\\s+])HTH([\\W+]|[\\s+]|$)
content.filter.replacement.66 = \ Hope This Helps
content.filter.pattern.67 = (^|[\\s+])HUGZ([\\W+]|[\\s+]|$)
content.filter.replacement.67 = \ Hugs
content.filter.pattern.68 = (^|[\\s+])IAE([\\W+]|[\\s+]|$)
content.filter.replacement.68 = \ In Any Event
content.filter.pattern.69 = (^|[\\s+])IANAL([\\W+]|[\\s+]|$)
content.filter.replacement.69 = \ I Am Not A Lawyer
content.filter.pattern.70 = (^|[\\s+])IAT([\\W+]|[\\s+]|$)
content.filter.replacement.70 = \ I am Tired
content.filter.pattern.71 = (^|[\\s+])OIC([\\W+]|[\\s+]|$)
content.filter.replacement.71 = \ Oh, I See!
content.filter.pattern.72 = (^|[\\s+])ICBW([\\W+]|[\\s+]|$)
content.filter.replacement.72 = \ I Could Be Wrong
content.filter.pattern.73 = (^|[\\s+])IDK([\\W+]|[\\s+]|$)
content.filter.replacement.73 = \ I Don't Know
content.filter.pattern.74 = (^|[\\s+])IGTP([\\W+]|[\\s+]|$)
content.filter.replacement.74 = \ I Get The Point
content.filter.pattern.75 = (^|[\\s+])IHNO([\\W+]|[\\s+]|$)
content.filter.replacement.75 = \ I Have No Opinion
content.filter.pattern.76 = (^|[\\s+])IHTFP([\\W+]|[\\s+]|$)
content.filter.replacement.76 = \ I Have Truly Found Paradise
content.filter.pattern.77 = (^|[\\s+])IIRC([\\W+]|[\\s+]|$)
content.filter.replacement.77 = \ If I Recall Correctly
content.filter.pattern.78 = (^|[\\s+])IIR([\\W+]|[\\s+]|$)
content.filter.replacement.78 = \ If I Recall
content.filter.pattern.79 = (^|[\\s+])IMAO([\\W+]|[\\s+]|$)
content.filter.replacement.79 = \ In My Arrogant Opinion
content.filter.pattern.80 = (^|[\\s+])IMHO([\\W+]|[\\s+]|$)
content.filter.replacement.80 = \ In My Humble Opinion
content.filter.pattern.81 = (^|[\\s+])IMNSHO([\\W+]|[\\s+]|$)
content.filter.replacement.81 = \ In My Not-So-Humble Opinion
content.filter.pattern.82 = (^|[\\s+])INPO([\\W+]|[\\s+]|$)
content.filter.replacement.82 = \ In No Particular Order
content.filter.pattern.83 = (^|[\\s+])IOW([\\W+]|[\\s+]|$)
content.filter.replacement.83 = \ In Other Words
content.filter.pattern.84 = (^|[\\s+])IRL([\\W+]|[\\s+]|$)
content.filter.replacement.84 = \ In Real Life
content.filter.pattern.85 = (^|[\\s+])IYKWIM([\\W+]|[\\s+]|$)
content.filter.replacement.85 = \ If You Know What I Mean
content.filter.pattern.86 = (^|[\\s+])IYKWIMAITYD([\\W+]|[\\s+]|$)
content.filter.replacement.86 = \ If You Know What I Mean And I Think You Do
content.filter.pattern.87 = (^|[\\s+])JM2C([\\W+]|[\\s+]|$)
content.filter.replacement.87 = \ Just My 2 Cents
content.filter.pattern.88 = (^|[\\s+])KBD([\\W+]|[\\s+]|$)
content.filter.replacement.88 = \ Keyboard
content.filter.pattern.89 = (^|[\\s+])ADR([\\W+]|[\\s+]|$)
content.filter.replacement.89 = \ Address
content.filter.pattern.90 = (^|[\\s+])AFAIC([\\W+]|[\\s+]|$)
content.filter.replacement.90 = \ As Far As I'm Concerned
content.filter.pattern.91 = (^|[\\s+])AFAIK([\\W+]|[\\s+]|$)
content.filter.replacement.91 = \ As Far As I Know
content.filter.pattern.92 = (^|[\\s+])AFAYC([\\W+]|[\\s+]|$)
content.filter.replacement.92 = \ As Far As You're Concerned
content.filter.pattern.93 = (^|[\\s+])L8R([\\W+]|[\\s+]|$)
content.filter.replacement.93 = \ Later
content.filter.pattern.94 = (^|[\\s+])LMAO([\\W+]|[\\s+]|$)
content.filter.replacement.94 = \ Laughing My Ankles Off
content.filter.pattern.95 = (^|[\\s+])LOLA([\\W+]|[\\s+]|$)
content.filter.replacement.95 = \ Laugh Out Loud Again
content.filter.pattern.96 = (^|[\\s+])LOOL([\\W+]|[\\s+]|$)
content.filter.replacement.96 = \ Laughing Outragously Out Loud
content.filter.pattern.97 = (^|[\\s+])LOL([\\W+]|[\\s+]|$)
content.filter.replacement.97 = \ Laughing Out Loud
content.filter.pattern.98 = (^|[\\s+])LTHFO([\\W+]|[\\s+]|$)
content.filter.replacement.98 = \ Laugh Til Head Falls Off
content.filter.pattern.99 = (^|[\\s+])LWR([\\W+]|[\\s+]|$)
content.filter.replacement.99 = \ Launch When Ready
content.filter.pattern.100 = (^|[\\s+])LYLAS([\\W+]|[\\s+]|$)
content.filter.replacement.100 = \ Love You Like a Sister
content.filter.pattern.101 = (^|[\\s+])MOMPL([\\W+]|[\\s+]|$)
content.filter.replacement.101 = \ One Moment Please
content.filter.pattern.102 = (^|[\\s+])MOO([\\W+]|[\\s+]|$)
content.filter.replacement.102 = \ Multi-user Dungeon Object-Oriented
content.filter.pattern.103 = (^|[\\s+])MOTAS([\\W+]|[\\s+]|$)
content.filter.replacement.103 = \ Member Of The Appropriate Sex
content.filter.pattern.104 = (^|[\\s+])MOTOS([\\W+]|[\\s+]|$)
content.filter.replacement.104 = \ Member Of The Opposite Sex
content.filter.pattern.105 = (^|[\\s+])MOTSS([\\W+]|[\\s+]|$)
content.filter.replacement.105 = \ Member Of The Same Sex
content.filter.pattern.106 = (^|[\\s+])MSG([\\W+]|[\\s+]|$)
content.filter.replacement.106 = \ Message
content.filter.pattern.107 = (^|[\\s+])MTBF([\\W+]|[\\s+]|$)
content.filter.replacement.107 = \ Mean Time Between Failure
content.filter.pattern.108 = (^|[\\s+])MTFBWY([\\W+]|[\\s+]|$)
content.filter.replacement.108 = \ May The Force Be With You
content.filter.pattern.109 = (^|[\\s+])MUAK([\\W+]|[\\s+]|$)
content.filter.replacement.109 = \ Smooch
content.filter.pattern.110 = (^|[\\s+])MUD([\\W+]|[\\s+]|$)
content.filter.replacement.110 = \ Multiple User Dungeon
content.filter.pattern.111 = (^|[\\s+])MUSH([\\W+]|[\\s+]|$)
content.filter.replacement.111 = \ Multi User Shared Hallucination
content.filter.pattern.112 = (^|[\\s+])XME([\\W+]|[\\s+]|$)
content.filter.replacement.112 = \ Excuse Me!
content.filter.pattern.113 = (^|[\\s+])NDA([\\W+]|[\\s+]|$)
content.filter.replacement.113 = \ Non-Disclosure Agreement
content.filter.pattern.114 = (^|[\\s+])NRN([\\W+]|[\\s+]|$)
content.filter.replacement.114 = \ No Reply Necessary
content.filter.pattern.115 = (^|[\\s+])NTK([\\W+]|[\\s+]|$)
content.filter.replacement.115 = \ Nice To Know
content.filter.pattern.116 = (^|[\\s+])OBJOKE([\\W+]|[\\s+]|$)
content.filter.replacement.116 = \ Obligatory Joke
content.filter.pattern.117 = (^|[\\s+])AAAAA([\\W+]|[\\s+]|$)
content.filter.replacement.117 = \ American Association Against Acronym Abuse
content.filter.pattern.118 = (^|[\\s+])WYWH([\\W+]|[\\s+]|$)
content.filter.replacement.118 = \ Wish You Were Here
content.filter.pattern.119 = (^|[\\s+])OMG([\\W+]|[\\s+]|$)
content.filter.replacement.119 = \ Oh My God
content.filter.pattern.120 = (^|[\\s+])ONNA([\\W+]|[\\s+]|$)
content.filter.replacement.120 = \ Oh No, Not Again
content.filter.pattern.121 = (^|[\\s+])ONNTA([\\W+]|[\\s+]|$)
content.filter.replacement.121 = \ Oh No, Not This Again
content.filter.pattern.122 = (^|[\\s+])OOI([\\W+]|[\\s+]|$)
```

```
content.filter.pattern.122 = \ Out Of Interest
content.filter.pattern.123 = (^|[\\s+])OSLT([\\W+]|[\\s+]|$)
content.filter.replacement.123 = \ Or Something Like That
content.filter.pattern.124 = (^|[\\s+])OTOH([\\W+]|[\\s+]|$)
content.filter.replacement.124 = \ On The Other Hand
content.filter.pattern.125 = (^|[\\s+])OTOOH([\\W+]|[\\s+]|$)
content.filter.replacement.125 = \ On The Other Other Hand
content.filter.pattern.126 = (^|[\\s+])OUSU([\\W+]|[\\s+]|$)
content.filter.replacement.126 = \ Oh, You Shut Up
content.filter.pattern.127 = (^|[\\s+])PDA([\\W+]|[\\s+]|$)
content.filter.replacement.127 = \ Public Display of Affection
content.filter.pattern.128 = (^|[\\s+])DCL([\\W+]|[\\s+]|$)
content.filter.replacement.128 = \ D C L
content.filter.pattern.129 = (^|[\\s+])PITA([\\W+]|[\\s+]|$)
content.filter.replacement.129 = \ Pain In The Ass
content.filter.pattern.130 = (^|[\\s+])PLS([\\W+]|[\\s+]|$)
content.filter.replacement.130 = \ Please
content.filter.pattern.131 = (^|[\\s+])PMFJI([\\W+]|[\\s+]|$)
content.filter.replacement.131 = \ Pardon Me For Jumping In
content.filter.pattern.132 = (^|[\\s+])PMIGBOM([\\W+]|[\\s+]|$)
content.filter.replacement.132 = \ Put Mind In Gear Before Opening Mouth
content.filter.pattern.133 = (^|[\\s+])PMJI([\\W+]|[\\s+]|$)
content.filter.replacement.133 = \ Pardon My Jumping In
content.filter.pattern.134 = (^|[\\s+])ML([\\W+]|[\\s+]|$)
content.filter.replacement.134 = \ M L
content.filter.pattern.135 = (^|[\\s+])POV([\\W+]|[\\s+]|$)
content.filter.replacement.135 = \ Point of View
content.filter.pattern.136 = (^|[\\s+])PPL([\\W+]|[\\s+]|$)
content.filter.replacement.136 = \ People
content.filter.pattern.137 = (^|[\\s+])RBAY([\\W+]|[\\s+]|$)
content.filter.replacement.137 = \ Right Back At Ya
content.filter.pattern.138 = (^|[\\s+])RFC([\\W+]|[\\s+]|$)
content.filter.replacement.138 = \ Request For Comments
content.filter.pattern.139 = (^|[\\s+])RFD([\\W+]|[\\s+]|$)
content.filter.replacement.139 = \ Request For Discussion
content.filter.pattern.140 = (^|[\\s+])RFI([\\W+]|[\\s+]|$)
content.filter.replacement.140 = \ Request For Information
content.filter.pattern.141 = (^|[\\s+])RIT([\\W+]|[\\s+]|$)
content.filter.replacement.141 = \ Alrighty
content.filter.pattern.142 = (^|[\\s+])ROFLASTC([\\W+]|[\\s+]|$)
content.filter.replacement.142 = \ Rolling On Floor Laughing And Scaring The Cat
content.filter.pattern.143 = (^|[\\s+])ROFLGO([\\W+]|[\\s+]|$)
content.filter.replacement.143 = \ Rolling On Floor Laughing Guts Out
content.filter.pattern.144 = (^|[\\s+])ROFLMAO([\\W+]|[\\s+]|$)
content.filter.replacement.144 = \ Rolling On Floor Laughing My Ass Off!
content.filter.pattern.145 = (^|[\\s+])ROFLOL([\\W+]|[\\s+]|$)
content.filter.replacement.145 = \ Rolling On Floor Laughing Out Loud
content.filter.pattern.146 = (^|[\\s+])ROTFLABIC([\\W+]|[\\s+]|$)
content.filter.replacement.146 = \ Rolling On The Floor Laughing And Biting Into Carpet
content.filter.pattern.147 = (^|[\\s+])ROTFL([\\W+]|[\\s+]|$)
content.filter.replacement.147 = \ Rolling On The Floor Laughing
content.filter.pattern.148 = (^|[\\s+])ROTFLOL([\\W+]|[\\s+]|$)
content.filter.replacement.148 = \ Rolling On The Floor Laughing Out Loud
content.filter.pattern.149 = (^|[\\s+])ROFL([\\W+]|[\\s+]|$)
content.filter.replacement.149 = \ Rolling On Floor Laughing
content.filter.pattern.150 = (^|[\\s+])RTFAQ([\\W+]|[\\s+]|$)
content.filter.replacement.150 = \ Read The Frequently Asked Questions
content.filter.pattern.151 = (^|[\\s+])RTFM([\\W+]|[\\s+]|$)
content.filter.replacement.151 = \ Read The Fine Manual
content.filter.pattern.152 = (^|[\\s+])RX([\\W+]|[\\s+]|$)
content.filter.replacement.152 = \ Regards
content.filter.pattern.153 = (^|[\\s+])SCNR([\\W+]|[\\s+]|$)
content.filter.replacement.153 = \ Sorry Couldn't Resist
content.filter.pattern.154 = (^|[\\s+])4EVR([\\W+]|[\\s+]|$)
content.filter.replacement.154 = \ Forever
content.filter.pattern.155 = (^|[\\s+])SFETE([\\W+]|[\\s+]|$)
content.filter.replacement.155 = \ Smiling From Ear To Ear
content.filter.pattern.156 = (^|[\\s+])SF([\\W+]|[\\s+]|$)
content.filter.replacement.156 = \ Science Fiction
content.filter.pattern.157 = (^|[\\s+])SMAIM([\\W+]|[\\s+]|$)
content.filter.replacement.157 = \ Send Me An Instant Message
content.filter.pattern.158 = (^|[\\s+])SME([\\W+]|[\\s+]|$)
content.filter.replacement.158 = \ Subject Matter Expert
content.filter.pattern.159 = (^|[\\s+])SNAFU([\\W+]|[\\s+]|$)
content.filter.replacement.159 = \ Situation Normal, All Fouled Up
content.filter.pattern.160 = (^|[\\s+])SNAILMAIL([\\W+]|[\\s+]|$)
content.filter.replacement.160 = \ Postal Mail Service
content.filter.pattern.161 = (^|[\\s+])SOHF([\\W+]|[\\s+]|$)
content.filter.replacement.161 = \ Sense Of Humor Failure
content.filter.pattern.162 = (^|[\\s+])ANFSCD([\\W+]|[\\s+]|$)
content.filter.replacement.162 = \ And Now For Something Completely Different
content.filter.pattern.163 = (^|[\\s+])SSEWBA([\\W+]|[\\s+]|$)
content.filter.replacement.163 = \ Someday Soon, Everything Will Be Acronyms
content.filter.pattern.164 = (^|[\\s+])MLK([\\W+]|[\\s+]|$)
content.filter.replacement.164 = \ Martin Luther King
content.filter.pattern.165 = (^|[\\s+])SWAG([\\W+]|[\\s+]|$)
content.filter.replacement.165 = \ Scientific Wild Ass Guess
content.filter.pattern.166 = (^|[\\s+])SWALK([\\W+]|[\\s+]|$)
content.filter.replacement.166 = \ Sealed With A Loving Kiss
content.filter.pattern.167 = (^|[\\s+])TAS([\\W+]|[\\s+]|$)
content.filter.replacement.167 = \ Taking A Shower
content.filter.pattern.168 = (^|[\\s+])TFDS([\\W+]|[\\s+]|$)
content.filter.replacement.168 = \ That's For Darn Sure
content.filter.pattern.169 = (^|[\\s+])THANX([\\W+]|[\\s+]|$)
content.filter.replacement.169 = \ Thanks
content.filter.pattern.170 = (^|[\\s+])THX([\\W+]|[\\s+]|$)
content.filter.replacement.170 = \ Thanks
content.filter.pattern.171 = (^|[\\s+])TIA([\\W+]|[\\s+]|$)
content.filter.replacement.171 = \ Thanks In Advance
content.filter.pattern.172 = (^|[\\s+])TNX([\\W+]|[\\s+]|$)
content.filter.replacement.172 = \ Thanks
content.filter.pattern.173 = (^|[\\s+])LBJ([\\W+]|[\\s+]|$)
content.filter.replacement.173 = \ Lyndon Baines Johnson
content.filter.pattern.174 = (^|[\\s+])FDR([\\W+]|[\\s+]|$)
content.filter.replacement.174 = \ Franklin Delano Roosevelt
content.filter.pattern.175 = (^|[\\s+])TPTB([\\W+]|[\\s+]|$)
content.filter.replacement.175 = \ The Powers That Be
content.filter.pattern.176 = (^|[\\s+])TSR([\\W+]|[\\s+]|$)
content.filter.replacement.176 = \ Terminal and Stay Resindent
content.filter.pattern.177 = (^|[\\s+])TTYL([\\W+]|[\\s+]|$)
content.filter.replacement.177 = \ Talk To You Later
content.filter.pattern.178 = (^|[\\s+])Xbox([\\W+]|[\\s+]|$)
content.filter.replacement.178 = \ X-Box
content.filter.pattern.179 = (^|[\\s+])TWIMC([\\W+]|[\\s+]|$)
content.filter.replacement.179 = \ To Whom It May Concern
content.filter.pattern.180 = (^|[\\s+])TYVM([\\W+]|[\\s+]|$)
content.filter.replacement.180 = \ Thank You Very Much
content.filter.pattern.181 = (^|[\\s+])sos([\\W+]|[\\s+]|$)
content.filter.replacement.181 = \ S O S
content.filter.pattern.182 = (^|[\\s+])DINK([\\W+]|[\\s+]|$)
content.filter.replacement.182 = \ Double Income, No Kids
content.filter.pattern.183 = (^|[\\s+])UR([\\W+]|[\\s+]|$)
content.filter.replacement.183 = \ Your
content.filter.pattern.184 = (^|[\\s+])VBG([\\W+]|[\\s+]|$)
content.filter.replacement.184 = \ Very Big Grin
content.filter.pattern.185 = (^|[\\s+])VBS([\\W+]|[\\s+]|$)
content.filter.replacement.185 = \ Very Big Smile
content.filter.pattern.186 = (^|[\\s+])VEG([\\W+]|[\\s+]|$)
content.filter.replacement.186 = \ Very Evil Grin
content.filter.pattern.187 = (^|[\\s+])VSF([\\W+]|[\\s+]|$)
content.filter.replacement.187 = \ Very Sad Face
content.filter.pattern.188 = (^|[\\s+])WAD([\\W+]|[\\s+]|$)
content.filter.replacement.188 = \ Without A Doubt
content.filter.pattern.189 = (^|[\\s+])WBS([\\W+]|[\\s+]|$)
content.filter.replacement.189 = \ Write Back Soon
content.filter.pattern.190 = (^|[\\s+])WB([\\W+]|[\\s+]|$)
content.filter.replacement.190 = \ Welcome Back
content.filter.pattern.191 = (^|[\\s+])WEG([\\W+]|[\\s+]|$)
content.filter.replacement.191 = \ Wicked Evil Grin
content.filter.pattern.192 = (^|[\\s+])WISP([\\W+]|[\\s+]|$)
content.filter.replacement.192 = \ Winning Is So Pleasureable
content.filter.pattern.193 = (^|[\\s+])WNOHGB([\\W+]|[\\s+]|$)
content.filter.replacement.193 = \ Were No One Has Gone Before
content.filter.pattern.194 = (^|[\\s+])WRT([\\W+]|[\\s+]|$)
content.filter.replacement.194 = \ With Respect To
content.filter.pattern.195 = (^|[\\s+])WTG([\\W+]|[\\s+]|$)
content.filter.replacement.195 = \ Way To Go
content.filter.pattern.196 = (^|[\\s+])WTH([\\W+]|[\\s+]|$)
content.filter.replacement.196 = \ What The Heck
content.filter.pattern.197 = (^|[\\s+])WTTM([\\W+]|[\\s+]|$)
content.filter.replacement.197 = \ Without Thinking To Much
content.filter.pattern.198 = (^|[\\s+])AATJ([\\W+]|[\\s+]|$)
content.filter.replacement.198 = \ And All That Jazz
content.filter.pattern.199 = (^|[\\s+])WT([\\W+]|[\\s+]|$)
content.filter.replacement.199 = \ Without Thinking
content.filter.pattern.200 = (^|[\\s+])XM([\\W+]|[\\s+]|$)
```

-continued

```
content.filter.replacement.200 = \ Excuse Me
content.filter.pattern.201 = (^|[\\s+])NY([\\W+]|[\\s+]|$)
content.filter.replacement.201 = \ New York
content.filter.pattern.202 = (^|[\\s+])DL([\\W+]|[\\s+]|$)
content.filter.replacement.202 = \ Download
content.filter.pattern.203 = (^|[\\s+])IMO([\\W+]|[\\s+]|$)
content.filter.replacement.203 = \ In My Opinion
content.filter.pattern.204 = (^|[\\s+])XO([\\W+]|[\\s+]|$)
content.filter.replacement.204 = \ Hugs, Kisses
content.filter.pattern.205 = (^|[\\s+])PD([\\W+]|[\\s+]|$)
content.filter.replacement.205 = \ Public Domain
content.filter.pattern.206 = (^|[\\s+])OS([\\W+]|[\\s+]|$)
content.filter.replacement.206 = \ Operating System
content.filter.pattern.207 = (^|[\\s+])AIM([\\W+]|[\\s+]|$)
content.filter.replacement.207 = \ A-I-M
#-------------------
# radio stations and TV Channels
#-------------------
content.filter.pattern.208 = (^|[\\s+])CNET([\\W+]|[\\s+]|$)
content.filter.replacement.208 = \ C-NET
content.filter.pattern.209 = (^|[\\s+])HPItv([\\W+]|[\\s+]|$)
content.filter.replacement.209 = \ HPI-TV
content.filter.pattern.210 = (^|[\\s+])OUTtv([\\W+]|[\\s+]|$)
content.filter.replacement.210 = \ OUT-TV
content.filter.pattern.211 = (^|[\\s+])HARDtv([\\W+]|[\\s+]|$)
content.filter.replacement.211 = \ HARD-tv
content.filter.pattern.212 = (^|[\\s+])MExcess([\\W+]|[\\s+]|$)
content.filter.replacement.212 = \ M-Excess
content.filter.pattern.213 = (^|[\\s+])MFest([\\W+]|[\\s+]|$)
content.filter.replacement.213 = \ M-Fest
content.filter.pattern.214 = (^|[\\s+])MFun([\\W+]|[\\s+]|$)
content.filter.replacement.214 = \ M-Fun
content.filter.pattern.215 = (^|[\\s+])MMore([\\W+]|[\\s+]|$)
content.filter.replacement.215 = \ M-More
content.filter.pattern.216 = (^|[\\s+])Mpix([\\W+]|[\\s+]|$)
content.filter.replacement.216 = \ M-plx
content.filter.pattern.217 = (^|[\\s+])mentv([\\W+]|[\\s+]|$)
content.filter.replacement.217 = \ men-tv
content.filter.pattern.218 = (^|[\\s+])ERT([\\W+]|[\\s+]|$)
content.filter.replacement.218 = \ E-R-T
content.filter.pattern.219 = (^|[\\s+])RTV([\\W+]|[\\s+]|$)
content.filter.replacement.219 = \ R-TV
content.filter.pattern.220 = (^|[\\s+])24x7([\\W+]|[\\s+]|$)
content.filter.replacement.220 = \ 24 7
content.filter.pattern.221 = (^|[\\s+])TVtropolis([\\W+]|[\\s+]|$)
content.filter.replacement.221 = \ TV-tropolis
content.filter.pattern.222 = (^|[\\s+])SR([\\W+]|[\\s+]|$)
content.filter.replacement.222 = \ S R
content.filter.pattern.223 = (^|[\\s+])ATT([\\W+]|[\\s+]|$)
content.filter.replacement.223 = \ A T T
#-------------------
# Provinces
#-------------------
content.filter.pattern.224 = (^|[\\s+])AB([\\W+]|[\\s+]|$)
content.filter.replacement.224 = \ Albertaa
content.filter.pattern.225 = (^|[\\s+])MB([\\W+]|[\\s+]|$)
content.filter.replacement.225 = \ Manitoba
content.filter.pattern.226 = (^|[\\s+])NB([\\W+]|[\\s+]|$)
content.filter.replacement.226 = \ New Brunswick
content.filter.pattern.227 = (^|[\\s+])NL([\\W+]|[\\s+]|$)
content.filter.replacement.227 = \ Newfoundland and Labrador
content.filter.pattern.228 = (^|[\\s+])NF([\\W+]|[\\s+]|$)
content.filter.replacement.228 = \ Newfoundland
content.filter.pattern.229 = (^|[\\s+])NT([\\W+]|[\\s+]|$)
content.filter.replacement.229 = \ Northwest Territories
content.filter.pattern.230 = (^|[\\s+])NS([\\W+]|[\\s+]|$)
content.filter.replacement.230 = \ Nova Scotia
content.filter.pattern.231 = (^|[\\s+])NU([\\W+]|[\\s+]|$)
content.filter.replacement.231 = \ Nunavut
content.filter.pattern.232 = (^|[\\s+])PE([\\W+]|[\\s+]|$)
content.filter.replacement.232 = \ Prince Edward Island
content.filter.pattern.233 = (^|[\\s+])PEI([\\W+]|[\\s+]|$)
content.filter.replacement.233 = \ Prince Edward Island
content.filter.pattern.234 = (^|[\\s+])SK([\\W+]|[\\s+]|$)
content.filter.replacement.234 = \ Saskatchewan
content.filter.pattern.235 = (^|[\\s+])YT([\\W+]|[\\s+]|$)
content.filter.replacement.235 = \ Yukon
#-------------------
#Others
#-------------------
content.filter.pattern.236 = ([0-9]+) HR
content.filter.replacement.236 = (_%%1%%_) hours
content.filter.pattern.237 = (^|[\\s+])HR([\\W+]|[\\s+]|$)
content.filter.replacement.237 = \ human resources
content.filter.pattern.238 = (^|[\\s+])LMO([\\W+]|[\\s+]|$)
content.filter.replacement.238 = \ Last Man Out
content.filter.pattern.239 = (^|[\\s+])LMOS([\\W+]|[\\s+]|$)
content.filter.replacement.239 = \ Leave Mail On Server
content.filter.pattern.240 = (^|[\\s+])Mahmoud([\\W+]|[\\s+]|$)
content.filter.replacement.240 = \ mahmood
content.filter.pattern.241 = (^|[\\s+])cT([\\W+]|[\\s+]|$)
content.filter.replacement.241 = \ C T
content.filter.pattern.242 = (^|[\\s+])ASLMH([\\W+]|[\\s+]|$)
content.filter.replacement.242 = \ Age Sex Location Music Hobbies
content.filter.pattern.243 = (^|[\\s+])Windows\\sMe([\\W+]|[\\s+]|$)
content.filter.replacement.243 = \ Windows M E
content.filter.pattern.244 = (^|[\\s+])III([\\W+]|[\\s+]|$)
content.filter.replacement.244 = \ Three
content.filter.pattern.245 = (^|[\\s+])II([\\W+]|[\\s+]|$)
content.filter.replacement.245 = \ Two
content.filter.pattern.246 = (^|[\\s+])Empires\\sI([\\W+]|[\\s+]|$)
content.filter.replacement.246 = \ Empires one
content.filter.pattern.247 = (^|[\\s+])Empires\\|([\\W+]|[\\s+]|$)
content.filter.replacement.247 = \ Empires one
content.filter.pattern.248 = (^|[\\s+])AISI([\\W+]|[\\s+]|$)
content.filter.replacement.248 = \ As I See It
content.filter.pattern.249 = (^|[\\s+])j2me([\\W+]|[\\s+]|$)
content.filter.replacement.249 = \ J2ME
content.filter.pattern.250 = (^|[\\s+])ASP([\\W+]|[\\s+]|$)
content.filter.replacement.250 = \ A S P
content.filter.pattern.251 = (^|[\\s+])KOTL([\\W+]|[\\s+]|$)
content.filter.replacement.251 = \ Kiss On The Lips
content.filter.pattern.252 = (^|[\\s+])KOTC([\\W+]|[\\s+]|$)
content.filter.replacement.252 = \ Kiss On The Cheek
content.filter.pattern.253 = (^|[\\s+])UFT([\\W+]|[\\s+]|$)
content.filter.replacement.253 = \ U F T
content.filter.pattern.254 = (^|[\\s+])MG([\\W+]|[\\s+]|$)
content.filter.replacement.254 = \ M G
content.filter.pattern.255 = (^|[\\s+])SOS([\\W+]|[\\s+]|$)
content.filter.replacement.255 = \ S O S
content.filter.pattern.256 = (^|[\\s+])\\.NET([\\W+]|[\\s+]|$)
content.filter.replacement.256 = \ dot NET
content.filter.pattern.257 = (^|[\\s+])\\.Net([\\W+]|[\\s+]|$)
content.filter.replacement.257 = \ dot Net
content.filter.pattern.258 = (^|[\\s+])\\.net([\\W+]|[\\s+]|$)
content.filter.replacement.258 = \ dot net
content.filter.pattern.259 = (^|[\\s+])\\\\\\\\([\\W+]|[\\s+]|$)
content.filter.replacement.259 = \ Three
content.filter.pattern.260 = (^|[\\s+])\\\\([\\W+]|[\\s+]|$)
content.filter.replacement.260 = \ Two
content.filter.pattern.261 = (^|[\\s])\\|([\\W+]|[\\s+]|$)
content.filter.replacement.261 = \ one
content.filter.pattern.262 = (^|[\\s+])UC([\\W+]|[\\s+]|$)
content.filter.replacement.262 = \ U C
content.filter.pattern.263 = (^|[\\s+])ASOASF([\\W+]|[\\s+]|$)
content.filter.replacement.263 = \ And So On And So Forth
content.filter.pattern.264 = (^|[\\s+])AWOL([\\W+]|[\\s+]|$)
content.filter.replacement.264 = \ Absent Without Leave
content.filter.pattern.265 = (^|[\\s+])WYSIWYG([\\W+]|[\\s+]|$)
content.filter.replacement.265 = \ What You See Is What You Get
#-------------------
# banks and financial groups
#-------------------
content.filter.pattern.266 = (^|[\\s+])BMO([\\W+]|[\\s+]|$)
content.filter.replacement.266 = \ Bee-Moe
content.filter.pattern.267 = (^|[\\s+])ING([\\W+]|[\\s+]|$)
content.filter.replacement.267 = \ I N Gee
content.filter.pattern.268 = (^|[\\s+])AG([\\W+]|[\\s+]|$)
content.filter.replacement.268 = \ A Gee
```

-continued

```
content.filter.pattern.269 = (^|[\\s+])UBS([\\W+]|[\\s+]|$)
content.filter.replacement.269 = \ U B S
#--------------------
# Time Zone
#--------------------
#AST Atlantic Standard Time
content.filter.pattern.270 = (^|[\\s+])AST([\\W+]|[\\s+]|$)
content.filter.replacement.270 = \ A S T
#IST: Irish Summer Time
content.filter.pattern.271 = (^|[\\s+])IST([\\W+]|[\\s+]|$)
content.filter.replacement.271 = \ I S T
#Eastern European Time
content.filter.pattern.272 = (^|[\\s+])EET([\\W+]|[\\s+]|$)
content.filter.replacement.272 = \ E E T
#Eastern European Summer Time
content.filter.pattern.273 = (^|[\\s+])EEST([\\W+]|[\\s+]|$)
content.filter.replacement.273 = \ E E S T
```

The following are example rules and corresponding tags for the sport context.

```
sports.headline.filters = 1
sports.body.filters = 1
sports.SP-NHL-Scores.headline.filters = 1
sports.SP-NFL-Scores.headline.filters = 1
sports.SP-NBA-Scores.headline.filters = 1
sports.SP-MLB-Scores.headline.filters = 1,2
sports.SP-NHL-News.headline.filters = 1
sports.SP-NFL-News.headline.filters = 1
sports.SP-NBA-News.headline.filters = 1,10
sports.SP-MLB-News.headline.filters = 1,2,3,4,5,6,7,8,9
sports.SP-NHL-Wrapup.headline.filters = 1
sports.SP-NFL-Wrapup.headline.filters = 1
sports.SP-NBA-Wrapup.headline.filters = 1
sports.SP-MLB-Wrapup.headline.filters = 1,2
sports.SP-FIFA-Scores.headline.filters = 1
sports.SP-FIFA-News.headline.filters = 1
sports.SP-FIFA-Wrapup.headline.filters = 1
content.filter.pattern.1 = Recap:
content.filter.replacement.1 =
content.filter.pattern.2 = St.\\x20
content.filter.replacement.2 = Saint
content.filter.pattern.3 = RHP
content.filter.replacement.3 = right handed pitcher
content.filter.pattern.4 = LHP
content.filter.replacement.4 = left handed pitcher
content.filter.pattern.5 = P\\x20
content.filter.replacement.5 = pitcher
content.filter.pattern.6 = DL
content.filter.replacement.6 = disabled list
content.filter.pattern.7 = OF
content.filter.replacement.7 = outfielder
content.filter.pattern.8 = IF
content.filter.replacement.8 = infielder
content.filter.pattern.9 = C\\x20
content.filter.replacement.9 = catcher
content.filter.pattern.10 = G\\x20
content.filter.replacement.10 = guard
```

The following are example rules and corresponding tags for the market context.

```
market.news.story.title.filters = 1,7,10,11
market.news.story.firstline.filters = 2,9
market.news.story.body.filters = 3,4,5,6,7,8,9,10,11,12,17
market.value.change.filters = 13,14,15,16
content.filter.pattern.1 = \\p{Alnum}*UPDATE\\p{Space}*\\p{Alnum}*\-
content.filter.replacement.1 =
content.filter.pattern.2 = \^\\x28\.*\\x29
content.filter.replacement.2 =
content.filter.pattern.3 = For details, see: \\x5b\\p{Alnum}+\\x5d
content.filter.replacement.3 =
content.filter.pattern.4 = \<[A-Z]*[_]?[A-z]*\.?(\%23\.)?(\.[A-Z]+)?[A-Z]*\>
content.filter.replacement.4 =
content.filter.pattern.5 = (\\x28Reporting by\.*\\x29)?\.*\\x40reuters\.*
content.filter.replacement.5 =
content.filter.pattern.6 = Keywords\:\.*
content.filter.replacement.6 =
content.filter.pattern.7 = Wall St
content.filter.replacement.7 = Wall Street
content.filter.pattern.8 = http\:.*
content.filter.replacement.8 =
content.filter.pattern.9 = \\x28Reuters\\x29
content.filter.replacement.9 =
content.filter.pattern.10 = S&P/TSX composite index
content.filter.replacement.10 = TSX composite index
content.filter.pattern.11 = &
content.filter.replacement.11 = \ and\ 
content.filter.pattern.12 = \\x28\\x24\\x31\\x3d\.*\\x29
content.filter.replacement.12 =
content.filter.pattern.12 = \\x28\\x24\\x31\\x3d\.*\\x29
content.filter.replacement.12 =
content.filter.pattern.13 = (0.)([0-9]+)
content.filter.replacement.13 = $2 cents
content.filter.pattern.14 = ([0-9]+)(.0+)$
content.filter.replacement.14 = $1 dollars
content.filter.pattern.15 = ([0-9]+)(.)([0-9]+)
content.filter.replacement.15 = $1 dollars and $3 cents
content.filter.pattern.16 = ([0-9]+)$
content.filter.replacement.16 = $1 dollars
content.filter.pattern.17 = \<[\\p{Print}]+\>
content.filter.replacement.17
```

The present invention has been described here by way of example only. Various modification and variations may be made to these exemplary embodiments without departing from the spirit and scope of the invention, which is limited only by the appended claims.

We claim:

1. A system for processing input media for provision to a text to speech engine, the system comprising:
a media processor;
a rules engine queried by the media processor, the rules engine configured to maintain and update rules for processing the input media, wherein the rules comprise pre-parsing rules, parsing rules, tagging rules, and post-parsing rules;
a pre-parsing filter module queried by the media processor, the pre-parsing filter module configured to determine one or more metadata attributes using pre-parsing rules, wherein one metadata attribute is an application type;
a parsing filter module queried by the media processor, the parsing filter module configured to query the rules engine for parsing rules associated with the one or more metadata attributes and to identify a content component from the input media using the parsing rules;
a context and language detector queried by the media processor, the context and language detector configured to determine a default context and a default language for at least part of the content component;
a learning agent queried by the media processor, the learning agent configured to divide the content component into units of interest;
a tagging module queried by the media processor, the tagging module configured to query the rules engine for tagging rules associated with the default context and the default language and to iteratively assign tags to the units of interest using the tagging rules, wherein each tag is associated with a post-parsing rule;
a post-parsing filter module queried by the media processor, the post-parsing filter module configured to modify the content component by executing the post-parsing rules identified by the tags assigned to the units of interest;

wherein the media processor queries the context and language detector, tagging module, learning agent and post-parsing filter module to iteratively process the content component and modifications thereto until there are no further modifications or a threshold number of iterations are performed; and an output module configured to transmit the modified content component.

2. The system of claim 1 further comprising:

a text to speech dictionary module queried by the media processor, the text to speech dictionary module configured to process common literals in the modified content component;

a formatting module queried by the media processor, the formatting module configured to convert the modified content component to speech synthesis markup language text with embedded speech directives; and a text to speech engine coupled to the media processor, the text to speech engine configured to convert the speech synthesis markup language text to speech signals and transmit the speech signals.

3. The system of claim 1 wherein the context and language detector is operable to detect a local language for one or more units of interest of the content component, wherein the local language is different from the default language; and wherein the tagging module is configured to query the rules engine for tagging rules associated with the local language.

4. The system of claim 1 wherein a metadata attribute is the default context, and wherein the pre-parsing module is configured to determine the default context based on the application type.

5. The system of claim 1 wherein a metadata attribute is the default language, and wherein the pre-parsing module is configured to determine the default language based on the language identifying meta-data or the application type.

6. The system of claim 1 wherein each rule comprises an ambiguous case resolution mechanism; wherein, in response to detecting an ambiguity in the content component, the ambiguous case resolution mechanism uses the metadata attributes and statistical data to statistically resolve the a ambiguity.

7. The system of claim 1 further comprising a quality assurance agent queried by the media processor, the quality assurance agent being prompted to resolve an ambiguity in the event the ambiguity cannot be resolved statistically within a pre-configured minimum level of confidence.

8. The system of claim 1 where in the pre-parsing module is configured to determine the one or more metadata attributes by applying different test rules to the input media;
computing a value for each test rule applied;
determining which test rule computed the highest score; and
using the test rule with the highest score to determine the one or more metadata attributes.

9. The system of claim 1 where in the pre-parsing module is configured to determine metadata attributes by comparing strings in the input media to a set of dictionaries.

10. The system of claim 9 wherein upon determining that two or more test rules have the same highest score, the pre-parsing module is further configured to apply a default priority list to determine which of the two or more test rules to use to determine the metadata attributes.

11. The system of claim 1 wherein each tag is associated with a confidence score and wherein when two or more tags conflict the post-parsing filter module is configured to execute the post-parsing rule associated with the tag with the highest confidence score.

12. The system of claim 1 wherein the tagging module is configured to iteratively assign the tags until no more tagging rules apply.

13. The system of claim 1 wherein the tagging module is configured to iteratively assign the tags until a maximum limit of tags per word is reached.

14. The system of claim 1 wherein the context and language detector determines the default context by computing, for each context, an aggregate score for the content component using a context model, wherein the context model defines, for each context, a list of strings and associated scores, wherein the default context is the context with the highest aggregate score for the content component.

15. A method for processing input media for provision to a text to speech engine comprising:

maintaining and updating rules for processing the input media, wherein the rules comprise pre-parsing rules, parsing rules, tagging rules, and post-parsing rules;

determining one or more metadata attributes using pre-parsing rules, wherein one metadata attribute is an application type;

identifying a content component from the input media using parsing rules associated with the one or more metadata attributes;

determining, for at least part of the content component, a default context and a default language;

dividing the content component into units of interest;

iteratively assigning tags to the units of interest using the tagging rules associated with the default context and the default language, wherein each tag is associated with a post-parsing rule;

modifying the content component by executing the post-parsing rules identified by the tags assigned to the phrases and strings;

iteratively processing the content component and modifications thereto until there are no further modifications or a threshold number of iterations are performed; and outputting the modified content component.

16. The method of claim 15 further comprising:

processing common literals in the modified content component;

converting the modified content component to speech synthesis markup language text with embedded speech directives; and converting the speech synthesis markup language text to speech signals and transmitting the speech signals.

17. The method of claim 15 further comprising detecting a local language for one or more phrases and strings of the content component, wherein the local language is different from the default language; and querying the rules engine for tagging rules associated with the local language.

18. The method of claim 15 wherein a metadata attribute is a default context, and the method further comprises determining the default context based on the application type.

19. The method of claim 15 wherein a metadata attribute is the default language, and the method further comprises determining the default language based on the language identifying meta-data or the application type.

20. The method of claim 15 wherein each rule comprises an ambiguous case resolution mechanism; wherein the method further comprises detecting an ambiguity in the content component and using the ambiguous case resolution mechanism to statistically resolve the a ambiguity based on the metadata attributes and statistical data.

21. The method of claim 20 further comprising prompting a quality assurance agent to resolve an ambiguity in the event the ambiguity cannot be resolved statistically with a preconfigured minimum level of confidence.

22. The method of claim 15 where determining the one or more metadata attributes comprises:
   applying different test rules to the input media;
   computing a value for each test rule applied;
   determining which test rule computed the highest score; and
   using the test rule with the highest score to determine the one or more metadata attributes.

23. The method of claim 15 where determining metadata attributes comprises comparing strings in the input media to a set of dictionaries.

24. The method of claim 22 wherein upon determining that two or more test rules have the same highest score, the method further comprises applying a default priority list to determine which of the two or more test rules to use to determine the metadata attributes.

25. The method of claim 15 wherein each tag is associated with a confidence score and wherein when two or more tags conflict the method further comprises executing the post-parsing rule associated with the tag with the highest confidence score.

26. The method of claim 15 further comprising iteratively assigning the tags until no more tagging rules apply.

27. The method of claim 15 further comprising iteratively assigning the tags until a maximum limit of tags per word is reached.

28. The method of claim 15 further comprising determining the default context by computing, for each context, an aggregate score for the content component using a context model, wherein the context model defines, for each context, a list of strings and associated scores, wherein the default context is the context with the highest aggregate score for the content component.

29. A non-transitory computer-readable medium upon which a plurality of instructions are stored, the instructions for performing the steps of:
   maintaining and updating rules for processing the input media, wherein the rules comprise pre-parsing rules, parsing rules, tagging rules, and post-parsing rules;
   determining one or more metadata attributes using pre-parsing rules, wherein one metadata attribute is an application type;
   identifying a content component from the input media using parsing rules associated with the one or more metadata attributes;
   determining, for at least part of the content component, a default context and a default language;
   dividing the content component into units of interest;
   iteratively assigning tags to the units of interest using the tagging rules associated with the default context and the default language, wherein each tag is associated with a post-parsing rule;
   modifying the content component by executing the post-parsing rules identified by the tags assigned to the phrases and strings;
   iteratively processing the content component and modifications thereto until there are no further modifications or a threshold number of iterations are performed; and
   outputting the modified content component.

* * * * *